United States Patent
Vangipuram

(10) Patent No.: US 12,332,066 B2
(45) Date of Patent: Jun. 17, 2025

(54) SYSTEM AND METHOD FOR PREDICTING EXPECTED TIME OF ARRIVAL (ETA) OF VEHICLES

(71) Applicant: Smart Tracking LLC, Lewes, DE (US)

(72) Inventor: Ranga Vangipuram, Lewes, DE (US)

(73) Assignee: SMART TRACKING LLC, Lewes, DE (US)

( * ) Notice: Subject to any disclaimer, the term of this patent is extended or adjusted under 35 U.S.C. 154(b) by 348 days.

(21) Appl. No.: 17/930,985

(22) Filed: Sep. 9, 2022

(65) Prior Publication Data

US 2023/0147526 A1 May 11, 2023

Related U.S. Application Data

(60) Provisional application No. 63/277,453, filed on Nov. 9, 2021.

(51) Int. Cl.
G01C 21/34 (2006.01)
G06Q 10/0637 (2023.01)
G06Q 10/04 (2023.01)

(52) U.S. Cl.
CPC ..... *G01C 21/3461* (2013.01); *G01C 21/3492* (2013.01); *G06Q 10/0637* (2013.01); *G06Q 10/04* (2013.01)

(58) Field of Classification Search
CPC ............ G01C 21/3461; G01C 21/3492; G06Q 10/0637; G06Q 10/04
See application file for complete search history.

(56) References Cited

U.S. PATENT DOCUMENTS

| 4,338,587 | A  | * | 7/1982  | Chiappetti | G07B 15/04 340/505 |
| 2013/0346165 | A1 | * | 12/2013 | Hedley | G08G 1/017 705/13 |
| 2018/0174449 | A1 | * | 6/2018  | Nguyen | G08G 1/0145 |

OTHER PUBLICATIONS

D. Fagan and R. Meier, "Intelligent time of arrival estimation," 2011 IEEE Forum on Integrated and Sustainable Transportation Systems, Vienna, Austria, 2011, pp. 60-66. (Year: 2011).*

N. Darapaneni et al., "Traffic Monitoring and Analysis At Toll Plaza," 2021 IEEE International IOT, Electronics and Mechatronics Conference (IEMTRONICS), Toronto, ON, Canada, 2021, pp. 1-6. (Year: 2021).*

(Continued)

*Primary Examiner* — Joan T Goodbody
(74) *Attorney, Agent, or Firm* — CHIP LAW GROUP

(57) ABSTRACT

Provided is a system for predicting expected time of arrival (ETA) of vehicles. The scanning module is installed at a toll plaza for electronic toll collection (ETC) scan of a tracked vehicle and same and similar (SaSi) vehicles crossing the toll plaza. The SaSi vehicles are identified based on a plurality of predetermined factors. The computation module computes a segment time for plurality of segments from time difference between the ETC scans in two consecutive toll plazas for the SaSi vehicles moving ahead of the tracked vehicle. The segment time is computed based on a defined criteria. A segment time is computed for plurality of segments in an event of presence of non-SaSi vehicles or absence of toll road. Based on the computed segment time and periodic error correction module between successive segments, the ETA of the tracked vehicle is predicted.

17 Claims, 6 Drawing Sheets

(56) References Cited

OTHER PUBLICATIONS

A. Zubair, S. M. Sagar, P. K. Saha and S. A. Fattah, "A design for low cost electronic toll collection system with secured data communication," International Conference on Electrical & Computer Engineering (ICECE 2010), Dhaka, Bangladesh, 2010, pp. 267-270. (Year: 2010).*

* cited by examiner

SYSTEM AND METHOD FOR PREDICTING EXPECTED TIME OF ARRIVAL (ETA) OF VEHICLES

CROSS-REFERENCE TO RELATED APPLICATIONS/INCORPORATION BY REFERENCE

This Patent Application makes reference to, claims priority to and the benefit from U.S. Provisional Application Ser. No. 63/277,453, filed Nov. 10, 2021, which is hereby incorporated by reference in its entirety.

FIELD OF TECHNOLOGY

The present invention is directed to a system for predicting expected time of arrival (ETA) of vehicles, more particularly to a system for predicting the ETA of vehicles using electronic toll collection system.

BACKGROUND

Freight transport through highways is a critical component in supply chain industry. In this component, goods or raw material are carried by the freight trucks through long distance to factories where they are processed further. The freight trucks are also used to carry finished goods to dealers, retailers and distribution services. Some examples of freight transport are carrying parts to an automobile factory for assembly, chemicals to synthesize pharmaceutical drugs, new cars to the dealers. These factories or dealers have plans based on the arrival of freight dispatched by their suppliers. As they wait for these supplies to arrive, they incur additional cost if there is a deviation from the ETA.

Visibility of the freight truck's current location and predicting ETA of these freight trucks is crucial for the operation of several industries. Making these predictions more accurate results in valuable benefits like reduced waiting time, reduced cost of production, efficient usage of labour and resources and higher output. These benefits are well captured in industry documents and analyst reports.

To solve this problem, there are systems available to track the freight truck from the beginning of journey from sender's location till end of journey at receiver's location. Such systems use global positioning system (GPS) technology to locate the current location of freight truck. ETA is then calculated based on (a) remaining distance (RD) to reach the destination and (b) predicted speed (PS) of vehicle in remaining distance. The RD may be easily calculated by subtracting the distance covered so far from total distance. But arriving at the PS for the RD is a challenge. However, there are certain disadvantages of tracking systems that are prevalent today. Present solutions use a) general data instead of specific data for type of vehicle being tracked; b) do not have access to important data in real-time; and c) technology limitations.

Current tracking systems use various data and algorithms to arrive at the PS. They have historical data on the actual speed of vehicle in different traffic conditions, different weather condition and in different segments of the highway. They also take actual speed data at different time of the day, day of the week, month of the year and other time windows to calculate their algorithm. These data are structured into time windows and the PS in each of these time windows are calculated and used to predict the ETA. The PS value is one aggregate value for all types of vehicles that have travelled through the highway in the past. Basically, it is one common PS for all types of vehicles. In reality, different types of vehicles travel at different speed based on their physical characteristics, functional requirement, constraints and regulatory restrictions. There are more than ten different sub-categories of freight trucks with each of them having very different characteristics and as a result will have different PS. Hence, using one common aggregated PS for all types of vehicles will result in lower accuracy.

Next, current GPS-based systems have data only for a subset of vehicles on the highway and not for all vehicles due to following reasons: a) Current systems use GPS devices for tracking and not all freight vehicles are installed with GPS devices; b) Even if some of them have GPS devices, they upload the data only to the vendor from whom they have bought the tracking system. This causes data for vehicles with GPS devices being fragmented across several disparate vendors and tracking system not connected to each other; c) as a result, the existing tracking system makes ETA prediction based on a fraction of complete data and that leads to less accurate prediction, compared to algorithm run with complete dataset. Vehicle type is not a key parameter for GPS based system and hence this data is not given importance. The absence of this data in a tracking system will make it difficult or impossible to identify vehicle type of vehicle and same or similar vehicles. As a result, these tracking systems can predict PS of generic vehicle type only, which leads to reduced accuracy of ETA prediction of freight vehicles. Data of vehicles traveling in adjacent segment and in the same time window as vehicle provides near real time data and hence increase the accuracy of prediction. Existing systems use historical data for prediction, and which provides lower accuracy of prediction.

Tracking systems using GPS-based technology for finding the current location and predicting ETA have some disadvantages due to usage of GPS technology. GPS-based solution relies on mobile network to update the server on its current location. Whenever there is an outage in the mobile network or a vehicle goes through a blind spot in mobile network the real-time ETA updates will be inaccurate or unavailable. They need installation of GPS device in vehicle, which needs initial investment and periodic maintenance cost. They have to be connected to mobile network through mobile service providers, which adds to recurring monthly/annual cost for the cargo carrier. Lastly, GPS related system are more prone to hacking compared to an RFID system.

Limitations and disadvantages of conventional and traditional approaches will become apparent to one of skill in the art, through comparison of described systems with some aspects of the present disclosure, as set forth in the remainder of the present application and with reference to the drawings

BRIEF SUMMARY OF THE DISCLOSURE

Systems and/or methods are provided for predicting expected time of arrival (ETA) of vehicles, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE EMBODIMENTS

Certain embodiments of the disclosure may be found in a system and a method for predicting the ETA of vehicles. As the conventional tracking systems calculate ETA primarily based on the RD to reach the destination and the PS of the vehicle in the remaining distance, the conventional system suffers from various deficiencies, such as low accuracy, increased waiting time, higher cost of production, inefficient usage of labour and resources, and lower output. In contrast, the proposed system and method provides an improved, easy to use and cost-effective system for predicting the ETA of vehicles using electronic toll collection system. The proposed system and method use specific data for each vehicle to be tracked in real time for accurate ETA predictions. The proposed system and method is capable of making consistent, accurate and smarter ETA predictions by utilizing complete data set of vehicle type and configuration along with data of vehicles traveling in adjacent segment and same window. The proposed system and method may provide all-time uninterrupted ETA predictions without having to make any heavy initial investment and periodic maintenance cost. The proposed system and method further ensures privacy and secrecy of the user as the system requires user authentication and any vehicle gets tracked only on request. The aforesaid and other objectives will become apparent from the ensuing description of the present invention.

Definitions:
a) Expected Time of Arrival (ETA): It is the time at which a specific vehicle is expected to arrive at a specific destination. Generally, ETA encompasses date, time, time zone and location specified in terms of postal address or geo location (latitude and longitude).
b) Sender: Entity (individual or company) which sends freight to receiver using services of cargo carrier.
c) Receiver: Entity (individual or company) which receives freight from sender through services of cargo carrier.
d) Cargo carrier: Entity (individual or company) which uses freight trucks to carry freight from sender to receiver location.
e) Upstream segments: Segments of toll that have already been crossed by the vehicle at this point of the journey.
f) Downstream segments: Segments of the toll way that are yet to be crossed by the vehicle at this point of the journey.
g) Segment Time: The amount of time vehicle is predicted to take to cross a given segment, and is represented by t [n] [k, k+1]. Number inside the first square bracket 'n' indicates the toll plaza that triggered this calculation, while [k, k+1] indicate the segment between two toll plazas 'k' and 'k+1' for which this prediction is made. This time includes both the driving time and waiting time at toll plaza at end of the segment.

Figure 1:
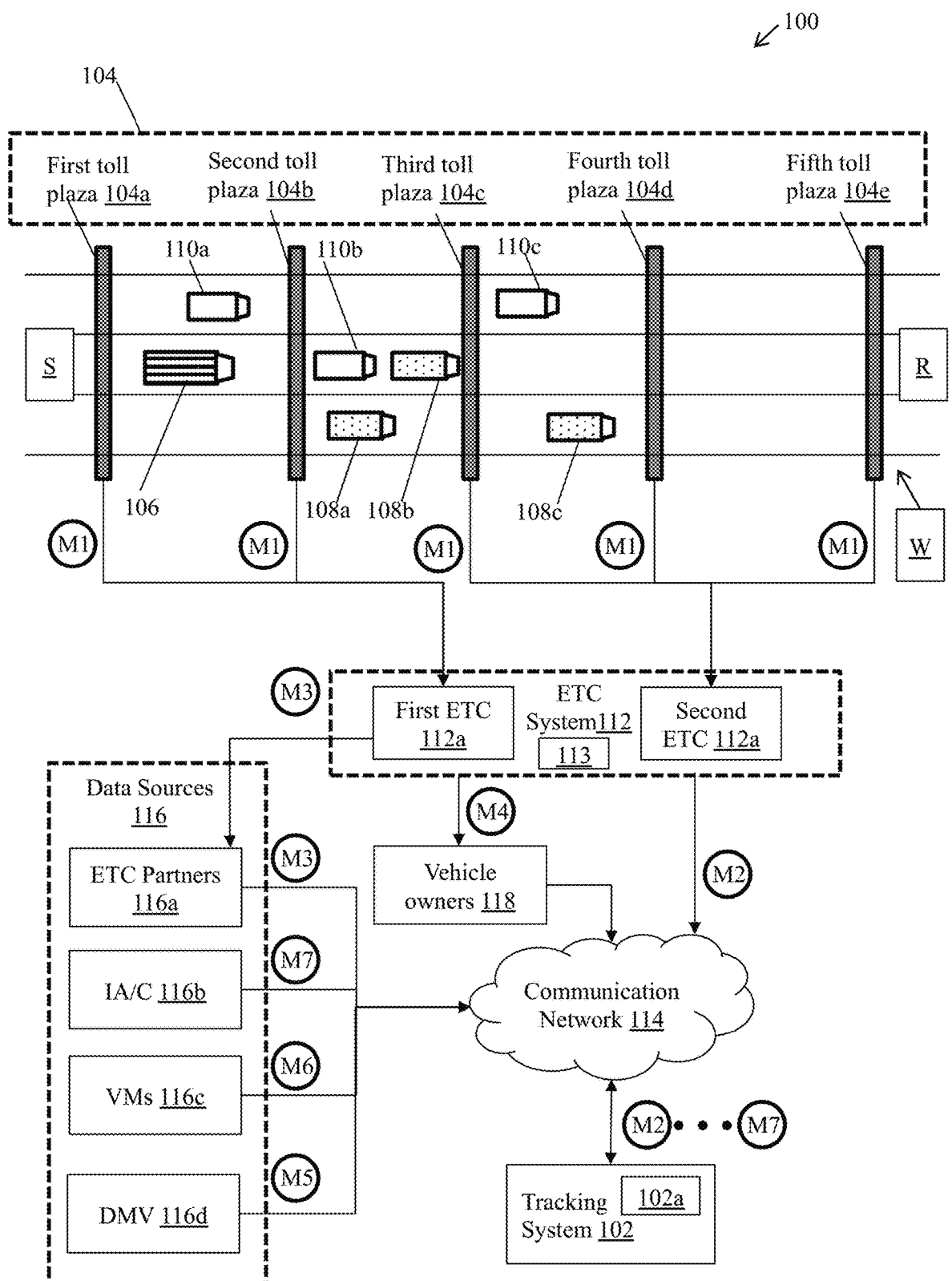
FIG. 1 is a block diagram that illustrates a network environment for predicting expected time of arrival (ETA) of vehicles, in accordance with an exemplary embodiment of the disclosure.

FIG. 1 is a block diagram that illustrates a network environment 100 for predicting ETA of vehicles, in accordance with an exemplary embodiment of the disclosure. The network environment 100 includes a tracking system 102 and a plurality of toll plazas 104, such as a first toll plaza 104a, . . . , fifth toll plaza 104e. The tracking system may comprise a computation module 102a. There is further shown a tracked vehicle 106, a first plurality of vehicles 108, and a second plurality of vehicles 110. The first plurality of vehicles 108 may include same and similar (SaSi) vehicles, such as a first SaSi vehicle 108a, a second SaSi vehicle 108b, and a third SaSi vehicle 108c. The second plurality of vehicles 110 may include non-SaSi vehicles, such as a first non-SaSi vehicle 110a, a second non-SaSi vehicle 110b, and a non-SaSi vehicle 110c. There is further shown an electronic toll collection (ETC) system 112, comprising a scanning module 113, communicatively coupled with each of the plurality of toll plazas 104. The various components of the network environment 100 may be communicatively coupled with each other via a communication network 114. The network environment 100 may further include various data sources 116 and vehicle owners 118. The data sources 116 may include various stakeholders, such as ETC partners 116a, industry associations/consortiums (IA/C) 116b, vehicle manufacturers (VMs) 116c, and the Department Of Motor Vehicles (DMV)116d.

The interactions between the various components in an exemplary deployment diagram, as illustrated in the network environment 100, is described based on exemplary messaging between such components. When the tracked vehicle 106 travels from the sender location 'S' to the receiver location 'R', it travels through the toll way 'W' and crosses multiple toll plazas, such as the plurality of toll plazas 104. The plurality of toll plazas 104 are part of the ETC system 112. As different part of the toll way 'W' are operated by different companies, the tracking system 102 may have to interact with ETC of each of these companies, such as the first ETC 112a and the second ETC 112b, for tracking of the tracked vehicle 106. As shown in FIG. 1, the first toll plaza 104a, the second toll plaza 104b, and the third toll plaza 104c are operated by the first ETC 112a and the fourth toll plaza 104d and the fifth toll plaza 104e are operated by the second ETC 112b.

Crossing data carrying information about license plate, crossing timestamp and toll plaza ID are sent by a toll plaza to their respective ETCs indicated by a first message, 'M1'.

In certain implementations, license plate in crossing data may be replaced with RFID tag or chassis number of the vehicle.

From one or more of the ETC system 112, the crossing data is received by the tracking system 102 in three possible ways (via the communication network 114): 1) directly as indicated by a second message, 'M2', 2) through ETC partners, such as 116a, as indicated by a third message, 'M3', or 3) through the vehicle owners 118, as indicated by a fourth message, 'M4'.

The tracking system 102 may determine the type of vehicle from license plate in a 2-step process. In the first step, the tracking system 102 may provide the license plate number to the DMV 116d and retrieves the make and model, as indicated by a fifth message, 'M5'. Based on the make and model, the tracking system 102 may retrieve vehicle type either from the VMs 116c, as indicated by a sixth message, 'M6', or from the IA/C 116b, which is a third party who maintains such information for all the manufacturers, as indicated by a seventh message, 'M7'. In accordance with an embodiment, all the above messages may be received by the tracking system 102 via the communication network 114.

The tracking system 102 may comprise suitable logic, circuitry, and interfaces that may be configured to predict the ETA of vehicles, such as the tracked vehicle 106. The tracking system 102 may be configured to track the tracked vehicle 106 in its trip from a sender location 'S' to a receiver location 'R'. The tracking system 102 may predict the ETA of the tracked vehicle 106 as the tracked vehicle 106 crosses each toll plaza from the plurality of toll plazas 104 enroute. The tracking system 102 may also predict the location of the tracked vehicle 106 during the trip.

In accordance with an embodiment, the computation module 102a of the tracking system 102 may be configured to calculate segment time by taking time difference between ETC scans performed by the ETC system 112, such as the first ETC 112a, in two consecutive toll plazas, such as the first toll plaza 104a and the second toll plaza 104b, for the first plurality of vehicles 108 moving ahead of the tracked vehicle 106. The tracking system 102 may use that time to calculate the ETA for the tracked vehicle 106. The tracking system 102 may be configured to consider various factors, such as traffic condition (historical and current), road condition (historical and current), weather condition (historical and current), driver profile and mood into consideration, vehicle characteristics, concept of similar vehicles, current condition, weight being carried, and the like. As the tracking system 102 has access to characteristics of the tracked vehicle 106, the first plurality of vehicles 108 and driver pattern for a trip, that further facilitates the calculation of the ETA. Hence, the prediction accuracy of the tracking system 102 at every toll plaza from the plurality of toll plazas 104 crossing is more than conventional tracking systems which do not have such data, thereby achieving better performance at a fractional cost of conventional GPS-based system. Thus, the tracking system 102 is more accurate than the conventional GPS-based algorithms because the tracking system 102 takes the PS from the same type of vehicle instead a generic type in the same time window. The tracking system 102 further involves acquiring data from multiple sources and running the prediction algorithm every time the tracked vehicle 106 crosses one of the plurality of toll plazas 104.

Each of the plurality of toll plazas 104, such as a first toll plaza 104a, . . . , fifth toll plaza 104e, may correspond to a counter/booth on a toll road where drivers of vehicles, such as the vehicle 106, the first plurality of vehicles 108, and the second plurality of vehicles 110 must stop or pass to pay the toll taxes to drive any further. The plurality of toll plazas 104 may be positioned on the toll road, also referred to as a turnpike or tollway, which may be a public or private controlled-access highway in the present day for which a fee (or toll) is assessed for passage.

On a toll way 'W', for example, upstream segments may be the segments of the toll way 'W' that have already been crossed by the tracked vehicle 106 at a point of the trip from the sender location 'S' to the receiver location 'R'. Further, downstream segments may be the segments of the toll way 'W' that are yet to be crossed by vehicle 106 at the point of the trip from the sender location 'S' to the receiver location 'R'. Furthermore, segment time may be the amount of time the tracked vehicle 106 is predicted to take to cross a given segment. The segment time is based on a toll plaza that triggered the calculation, and a segment between the two toll plazas for which the time is predicted.

The tracked vehicle 106 may correspond to a freight carrier associated with an individual or a legally authorized commercial company that specializes in transporting cargo from one place, such as the sender location 'S' to another, such as the receiver location 'R'. The tracked vehicle 106 may be categorized into many variant divisions based on each carrier's business operation.

Each of the first plurality of vehicles 108 and the second plurality of vehicles 110 may correspond to a reference vehicle that may be used to predict the ETA of the tracked vehicle 106. More specifically, based on physical and vehicle characteristics of the tracked vehicle 106 and using a set of reference vehicles, such as the first plurality of vehicles 108, which have the same or similar characteristics, the ETA of the tracked vehicle 106 may be predicted by the tracking system 102. Accordingly, the reference vehicle may be categorized as one of the first plurality of vehicles 108 (such as the first SaSi vehicle 108a, the second SaSi vehicle 108b, and the third SaSi vehicle 108c) or the second plurality of vehicles 110 (such as the first non-SaSi vehicle 110a, the second non-SaSi vehicle 110b, and the non-SaSi vehicle 110c) for such prediction. Table 1 given below enlists the attributes that may be used to define the SaSi vehicles, i.e., the first plurality of vehicles 108. Table 1 classifies four categories of the SaSi vehicles based on how close the reference vehicle is to the tracked vehicle 106.

When the reference vehicle is exactly the same type as the tracked vehicle 106 in all aspects (i.e., all the attributes listed in Table 1), then the reference vehicle may be categorized as Same (Sa). Example comprising, though not limiting to, same make, model, year, and the like. The closest set of reference vehicles to a tracked vehicle, i.e. the tracked vehicle 106, and this category will be the first in priority while choosing SaSi vehicles, i.e., the first plurality of vehicles 108, from available dataset.

When the reference vehicle is same as the tracked vehicle 106, i.e., the tracked vehicle 106, in critical attributes, but may differ in other attributes, then the reference vehicle may be categorized as Similar 1 (Si1). Critical attributes that match with the tracked vehicle, i.e., the tracked vehicle 106, may be Chassis Type, No. Of Axles, No. Of Tractor axles, No. of semitrailer Axles, Cargo Type, Maximum Speed, Speed Limiter, and the like. Such category may be the second in priority while choosing SaSi vehicles, i.e., the first plurality of vehicles 108, from available dataset.

When the reference vehicle is same as the tracked vehicle, i.e., the tracked vehicle 106, in certain important attributes which has major impacts on the speed of the truck/vehicle, but may differ in other attributes, then they would be categorized as Similar 2 (Si2). The attributes that have impact on the speed may be Chassis Type, No. Of Tractor Axles, Cargo Type, Speed Limiter, and the like. Such category may be the third in priority while choosing SaSi vehicles, i.e., the first plurality of vehicles 108, from available dataset.

When the reference vehicle is same as the tracked vehicle, i.e., the tracked vehicle 106, in a very few attributes, but may differ in other attributes, then such vehicle may be categorized as Similar 3 (Si3). The few attributes which have to match are Chassis Type and Speed Limiter. Such category may be the fourth in priority while choosing SaSi vehicles, i.e., the first plurality of vehicles 108, from available dataset.

A 'Yes' in a particular cell of the Table 1 indicates that the reference vehicle should have the exact same value as the tracked vehicle 106 to be considered as a SaSi vehicle. A 'Yes/No' may mean that the reference vehicle need not match the tracked vehicle, i.e., the tracked vehicle 106, values for that particular attribute.

TABLE 1

| S.No. | Attribute | Same | Similar 1 | Similar 2 | Similar 3 |
|---|---|---|---|---|---|
| 1 | Make | Yes | Yes/No | Yes/No | Yes/No |
| 2 | Model | Yes | Yes/No | Yes/No | Yes/No |
| 3 | Year | Yes | Yes/No | Yes/No | Yes/No |
| 4 | Power | Yes | Close | Close | Close |
| 5 | Chassis Type | Yes | Yes | Yes | Yes |
| 6 | No. of Axles | Yes | Yes | Near | Near |
| 7 | No. of Tractor Axles | Yes | Yes | Yes | Near |
| 8 | No. of semi-trailer Axles | Yes | Yes | Near | Near |
| 9 | Turning Radius | Yes | Close | Close | Close |
| 10 | Wheel Base | Yes | Close | Close | Close |
| 11 | Height | Yes | Close | Close | Close |
| 12 | Length | Yes | Close | Close | Close |
| 13 | Weight | Yes | Close | Close | Close |
| 14 | Cargo Type | Yes | Yes | Yes | Any |
| 15 | Maximum Speed | Yes | Yes | Close | Close |
| 16 | Speed Limiter | Yes | Yes | Yes | Yes |

The ETC system 112 may comprise suitable logic, circuitry, and interfaces that may be configured to uniquely identify each vehicle passing through each of the plurality of toll plazas 104 and collects fees for usage of toll roads operated by it. The ETC system 112 may uses one or more of a variety of technologies. For example, the ETC system 112 may use RFID technology, wherein an RFID tag is attached to the vehicle and is identified by RFID readers installed in each of the plurality of toll plazas 104. In another example, the ETC system 112 may use a camera as capturing device, which takes the picture of license plate of the vehicle and may use a software to decode the license plate number. In yet another example, the ETC system 112 may use Bluetooth technology, wherein Bluetooth signals may be emitted from device or mobile phone carried in the vehicle and read by Bluetooth reader in each of the plurality of toll plazas 104. In yet another example, the ETC system 112 may use manual effort for reading of vehicle license plate and entering it into computer system. It should be noted that the above examples are merely for understanding purposes, and other emerging technologies, such as GPS, is also being evaluated by ETC vendors for deployment, without any deviation from the scope of the disclosure.

The scanning module 113 in the ETC system 112 may comprise suitable logic, circuitry, and interfaces that may be configured to scan timestamps of each vehicle at each of the plurality of toll plazas 104 on a real-time basis only with data sharing arrangement with the ETC system 112 or the DMV 116d. Accordingly, the scanning module 113 in the ETC system 112 may uniquely and reliably identify each vehicle. The scanning module 113 may use one or a combination of the technologies, as discussed above, to improve the reliability identification.

The communication network 114 may comprise suitable logic, circuitry, and interfaces that may be configured to facilitate communication between different components, systems and/or sub-systems of the network environment 100. In various embodiments, the network environment 100 may be implemented using any number or type of communication networks.

The communication network 114 may facilitate usage of a plurality of network ports and a plurality of communication channels for transmission and reception of communication data. The communication data may correspond to data received and/or exchanged, via local area network and the wide area network, among the edge resources and the cloud resources, such as the data sources 116. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. The communication data may be transmitted or received via a communication protocol, the examples of which may include, but are not limited to, a short-range communication protocol, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT). It may also include mobile protocols, such as GSM, CDMA, LTE, 2G/3G/4G/5G and the like.

The data sources 116, such as the ETC partners 116a, the IA/C 116b, the VMs 116c, and the DMV 116d, may refer to various entities in the network environment 100 that may provide data to the tracking system 102 for the prediction of the ETA of the tracked vehicle 106. The data sources 116 may be realized as cloud or remote resources communicatively connected to the tracking system 102 facilitated by internet, short message service (SMS), application programming interface (API), and other communication and messaging systems.

Primary Data: When the tracked vehicle 106 starts from the sender location 'S', the sender may initiate the tracking by providing a variety of information to the tracking system 102, such as sender ID, receiver ID, address of the starting location, address of destination location, vehicle License Number, and route which includes all the plurality of toll plazas 104 on the way. The sender may provide additional information, such as weight of the tracked vehicle 106 in the current trip, vehicle make/model/year, mileage clocked by the tracked vehicle 106 in the odometer when the trip starts, rest area where the driver may take a sleep break, and a backup driver available for the trip. that may improve the accuracy of the ETA.

Data from ETC Partners 116a: Data, such as license plate number, toll plaza ID, and time at which the ETC was scanned, by the ETC Partners 116a.

Data from the IA/C 116b and the VMs 116c: Data, such as engine power, chassis type, number of axles, number of tyres, minimum turning circle, and length/width/gross vehicle weight may be provided by the VMs 116c based on make/model/year of the tracked vehicle 106. Such data provides vehicle attributes, one of the key concepts that define the SaSi vehicles. A representative sample of the attributes are provided in Table 1, as provided above. The data may also be retrieved from industry consortiums or third party data providers.

Data from the DMV 116d: Data, such as make/model/year of manufacture, chassis no., engine no., body type, and fuel type, may be provided by the DMV 116d based on the license plate number of the tracked vehicle 106.

Each of the vehicle owners 118 may correspond to an individual or a company that owns a freight truck that is used to carry the freight from the sender location 'S' to the receiver location a'. This information may be available in the records maintained by the DMV along with the license plate number assigned to a vehicle.

In operation, the scanning module 113 installed at a toll plaza for an ETC scan of the tracked vehicle 106 and the first plurality of vehicles 108 crossing the toll plaza. The first plurality of vehicles 108 may be identified based on a plurality of predetermined factors. Further, the computation module 102a of the tracking system 102 may be configured to compute a segment time for a plurality of segments from time difference between the ETC scans in two consecutive toll plazas for the first plurality of vehicles 108 moving ahead of the tracked vehicle 106. A segment may be defined between a starting point and a final destination of a vehicle journey with a toll plaza at beginning and end of the segment.

In accordance with an embodiment, the computation module may be further configured to compute the segment time based on actual driving time along with actual waiting time of the first plurality of vehicles 108 at the toll plaza. The first plurality of vehicles 108 may be identified based on the predetermined factors through statistical methods or machine learning algorithms such as time series analysis. The plurality of predetermined factors comprises driver characteristics that determine deviation of a driver from an average speed in an upstream segment for addition to predicted value in downstream segments, and a delay at the toll plaza. The segment time may be computed by the tracking system 102 based on a defined criteria. The defined criteria may comprise at least a method, a vehicle type, a time window, and one or more features. The first plurality of vehicles 108 may be travelling in same segment time under similar weather, traffic and road conditions in the same time window. Further, the first plurality of vehicles 108 may be moving ahead of the tracked vehicle 106 by at least one toll plaza. In an event vehicles are outside the same time window, the first plurality of vehicles 108 may be identified from the vehicles based on vehicle characteristics, segment of toll way, and traveling time with differential weights assigned for different time windows.

The computation module 102a of the tracking system 102 may be further configured to compute a segment time for the plurality of segments in an event of presence of the second plurality of vehicles 110 or an absence of toll road, such as the toll way 'W'. In accordance with an embodiment, in an event of the absence of toll road or a journey with presence of non-SaSi vehicles (i.e., the second plurality of vehicles 110), a non-SaSi approach may be adopted based on speed differentiable method or speed ratio methods, time window, toll plaza delay and driver characteristics.

Accordingly, the computation module 102a of the tracking system 102 may be configured to predict the ETA of the tracked vehicle 106 based on the computed segment time and a periodic error correction module between successive segments.

To summarize, the proposed system uses SaSi data that are not considered by most of the GPS-based system, but important for accurate prediction of ETA of freight vehicles, such as the tracked vehicle 106. In some GPS-based system where it is considered, the data available for them is a fraction of the total data and hence the accuracy are lower. Also, it is cumbersome, inefficient and unreliable to acquire SaSi data through GPS-based system. The proposed system provides a reliable, real-time and cost-effective method to acquire SaSi data through ETC scans in toll plaza, data fusion from multiple sources, and ML algorithm or Statistical methods to identify the SaSi and calculate ETA. The proposed system predicts the ETA for each segment of the toll way separately based on SaSi behaviour and Time Window for that segment. Thereafter, ETA for all the segments is added to get the final ETA. The proposed tracking system 102 collects data through interaction between computer systems of stakeholders using API and notification designed by the proposed system. Also, algorithm is run on the tracking system 102 from the data thus collected and ETA is sent in real-time to stakeholders registered to receive it.

Figure 2A:
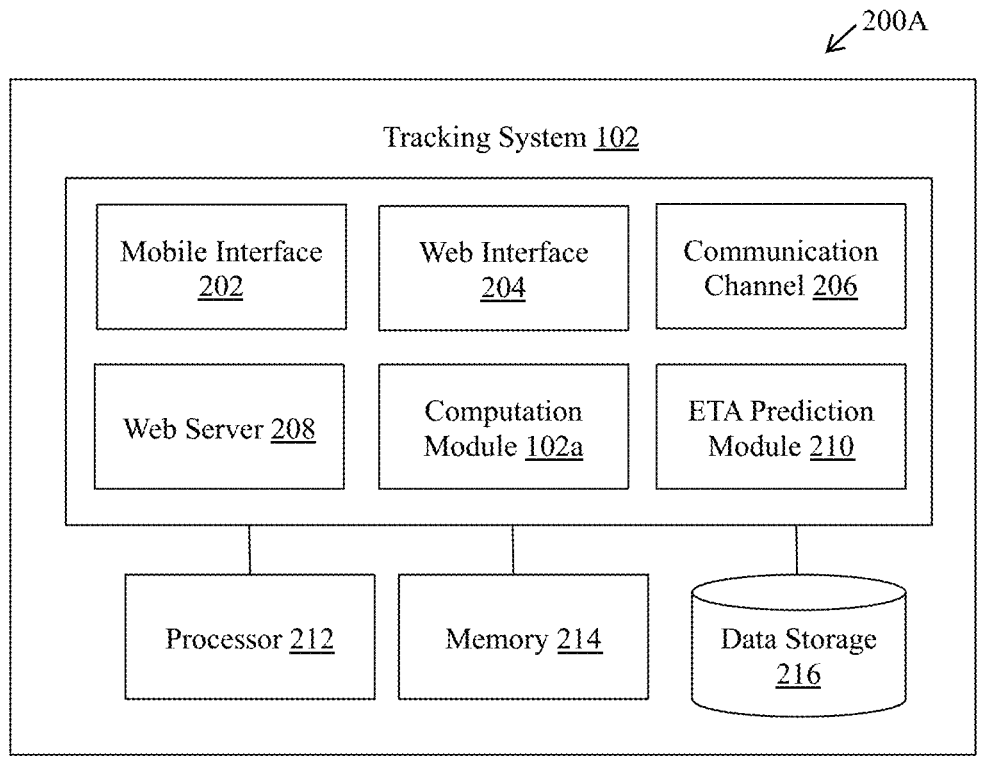
FIG. 2A is a block diagram that illustrates the tracking system for predicting ETA of vehicles, in accordance with an exemplary embodiment of the disclosure.
Figure 2B:
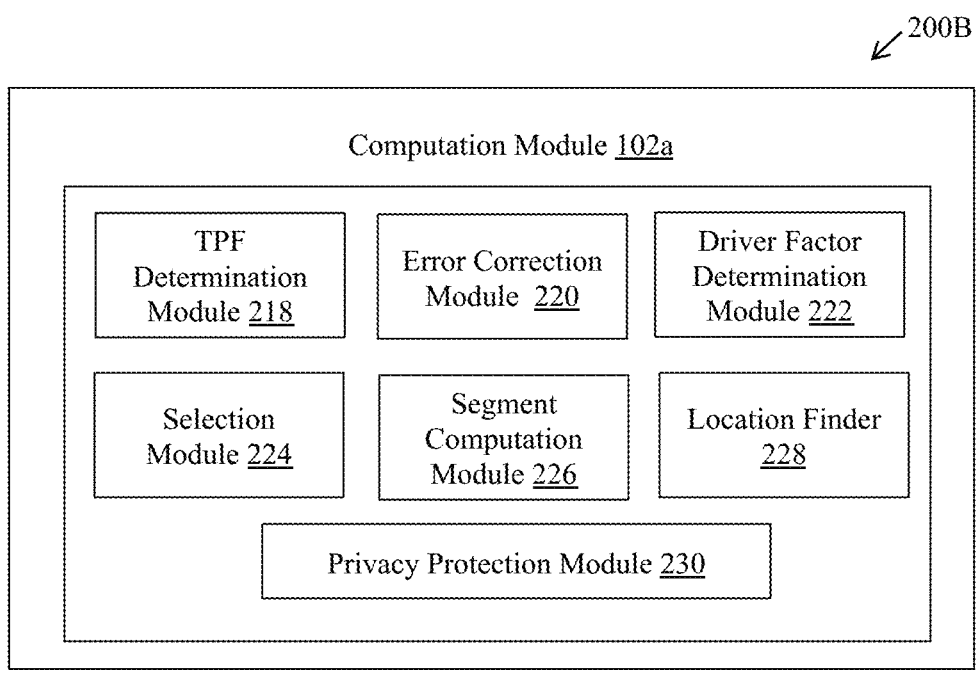
FIG. 2B is a block diagram that illustrates the computation module of the tracking system for predicting ETA of vehicles, in accordance with an exemplary embodiment of the disclosure.

FIG. 2A is a block diagram 200A that illustrates the tracking system 102 for predicting ETA of vehicles, in accordance with an exemplary embodiment of the disclosure. The block diagram 200A of FIG. 2A illustrates the tracking system 102 depicting a mobile interface 202, a web interface 204, a communication channel 206, a web server 208, the computation module 102a and an ETA prediction module 210. There are further illustrated a processor 212, a memory 214, and a data storage 216. Further, FIG. 2B is a block diagram 200B that illustrates the computation module 102a of the tracking system 102 for predicting ETA of vehicles, in accordance with an exemplary embodiment of the disclosure. The block diagram 200B of FIG. 2B illustrates the computation module 102a of the tracking system 102 depicting a toll plaza factor determination module 218, an error correction module 220, a driver factor determination module 222, a selection module 224, a segment computation module 226, a location finder 228, and a privacy protection module 230. FIGS. 2A and 2B are described in conjunction with FIG. 1.

Referring to FIG. 2A, the mobile interface 202 may comprise suitable logic, circuitry, and interfaces that may be configured to present a graphical and usually touch-sensitive display on a display unit associated with the tracking system 102. The mobile interface 202 may allow a user, such as a mobile user, to interact with various functionalities, such as apps, features, content and functions, of the tracking system 102. In accordance with an embodiment, the mobile interface 202 may provide one or more panes or windows for viewing communications, files, lists, links, and the like, associated with one or more teams of which the user is a member. In accordance with an embodiment, other panes may be displayed in response to swiping a first pane in a defined direction, such as left-to-right direction or a right-to-left direction.

The web interface 204 may comprise suitable logic, circuitry, and interfaces that may be configured to allows a user to interact with content or software running on the tracking system 102 (as a remote server) through a web browser. The content or web page may be downloaded from the web server and the user may interact with such content in a web browser, which acts as a client.

The communication channel 206 may comprise suitable logic, circuitry, and interfaces that may be configured to facilitate transmission and/or receipt of communication data. The communication channel may include, but is not limited to, a wireless channel, a wired channel, or a combination of wireless and wired channel thereof. The wireless or wired channel may be associated with a data standard which may be defined by one of a Local Area Network (LAN), a Personal Area Network (PAN), a wireless personal LAN (WPLAN), a Wireless Local Area Network (WLAN), a Wireless Sensor Network (WSN), a WAN, and a Wireless Wide Area Network (WWAN), the Internet, cellular networks, Wireless Fidelity (Wi-Fi) networks, short-range networks (for example, Bluetooth® or ZigBee®), and/or any other wired or wireless communication networks or mediums. In accordance with an embodiment, the wired channel may be selected based on the bandwidth criteria. For example, an optical fiber channel may be used for a high bandwidth communication, and a coaxial cable (or Ethernet-based communication channel) may be used for moderate bandwidth communication. In accordance with various embodiments, any, some, combination, or all of the systems, engines, and/or sub-systems of the network environment 100 may be adapted to execute any operating system, such as Linux-based operating systems, UNIX-based operating systems, Microsoft Windows, Windows Server, MacOS, Apple iOS, Google Android, or other customized and/or proprietary operating system. The systems, engines, and/or sub-systems of the network environment 100 may be adapted to execute such operating systems along with virtual machines adapted to virtualize execution of a particular operating system.

The web server 208 may comprise suitable logic, circuitry, and interfaces that may be configured to respond to requests generated by a plurality of client devices on the World Wide Web, with the use of hypertext transfer protocol (HTTP) and other protocols. The web server 208 may store and configure all website data to protect data from unauthorized users. The web server 208 may enable accessibility to hosted websites that includes availability of back-end database server services and more. The web server 208 may help in controlling the bandwidth and minimize excess network traffic, thus regulating the overall traffic in the network and preventing downtime caused by surplus web traffic. The presence of the web server 208 may enable the creation of dynamic web pages in popular scripting languages, such as Perl, Ruby, Python, and others.

The ETA prediction module 210 may comprise suitable logic, circuitry, and interfaces that may be configured to retrieve an ETA prediction algorithm from the data storage 216. Based on the execution of the ETA prediction algorithm by the ETA prediction module 210, the ETA may be predicted for the trip when the tracked vehicle 106 crosses a given toll plaza from the plurality of toll plazas 104. The execution of the ETA algorithm once is called an ETA Iteration. An ETA Iteration may be triggered whenever the tracked vehicle 106 crosses a toll plaza and during the start of the trip.

As described above, a distance between the sender location 'S' and the receiver location 'R' may consist of multiple segments, with each segment defined by a toll plaza at the beginning and end of the segment. It may be noted that two exceptions are the first and the last segment of the trip, which will have a toll plaza only in one of their ends.

The ETA prediction module 210 may initiate the ETA prediction algorithm and calculate the predicted time for travelling each segment separately using a segment algorithm. The returned value may be t[n][k, k+1], where 'n' is the toll plaza which triggered the algorithm and [k, k+1] defines a particular segment. In accordance with an embodiment, the selection module 224 may be configured to select a suitable segment algorithm, based on the data available for that particular segment and iteration. The segment algorithm selected by the selection module 224 may be used for arriving at a predicted travelling time t[n][k,k+1]. Once the t[n][k,k+1] is calculated for all the segments, they are added together to arrive at the ETA_AT[n], which is the predicted ETA when the tracked vehicle 106 crossed the toll plaza 'n'. This is called one iteration of the ETA prediction algorithm. By way of an example, when the tracked vehicle 106 started from the sender location 'S', n=0 and ETA_AT[0], i.e., the first iteration of the ETA algorithm, may be expressed as:

$$ETA\_AT[0]=t[0][0,1]+t[\ ][1,2]+t[\ ][2,3]\ldots t[0][\text{last}-1,\text{last}]$$

When the tracked vehicle 106 crosses the first toll plaza in the toll way 'W', n=1 and ETA_AT[1], i.e., the second iteration of the ETA prediction algorithm, may be expressed as: $ETA\_AT[1]=t[1][1,2]+t[1][2,3]\ldots t[1]\,[\text{last-1,last}]$ The ETA prediction algorithm may iterate till the tracked vehicle 106 reaches the last toll plaza "end-1", when the last iteration of the ETA prediction algorithm will be executed for the trip.

The processor 212 may comprise suitable logic, circuitry, and interfaces that may be configured to determine an executable operation of the tracking system 102 based on executable instructions stored in the memory 214 or commands provided by the user. In accordance with an embodiment, the computing functionalities of the processor 212 in the tracking system 102 disclosed herein may be implemented in one or more silicon cores in a reduced instruction set computing (RISC) processor, an ASIC processor, a complex instruction set computing (CISC) processor, FPGAs, and other semiconductor chips, processors, or control circuits.

It should be noted that the terms "processor" or "microprocessor" referred in FIG. 2A include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar device, combination of devices, or logic elements (hardware or software) that permit the execution of instructions.

The memory 214 may comprise suitable logic, circuitry, and interfaces that may be configured to store data supporting various functions of the tracking system. The memory 214 may store a number of application programs or applications running on the tracking system 102, data for operation of the tracking system 102, and commands. The memory 214 may store information and/or instructions for use in combination with the processor 212. The memory 214 may include volatile and non-volatile memory, such as random access memory (RAM) and read only memory (ROM). A number of program modules may be stored on the hard disk, external disk, the ROM or the RAM, including an operating system (not shown), one or more application programs, other program modules (not shown), and program data. The RAM may be of any type, such as Static RAM (SRAM), Dynamic RAM (DRAM), or Synchronous Dynamic RAM (SDRAM). A basic input/output system (BIOS) containing the basic routines that helps to transfer information between elements within the tracking system 102, such as during start-up, may be stored in the ROM.

The data storage 216 may comprise suitable logic, circuitry, and interfaces that may be configured to store various algorithms and programs required for predicting the ETA of vehicles. For example, the data storage 216 may store the ETA prediction algorithm that may be retrieved by the ETA prediction module 210 for calculate the predicted time for travelling each segment separately. In another example, the data storage 216 may store various segmentation computation algorithms, such as statistical and machine learning (ML) algorithms, that may be retrieved by the segmentation computation module 226, in conjunction with the selection module 224, for computing the segments on the toll way 'W'.

The TPF determination module 218 may comprise suitable logic, circuitry, and interfaces that may be configured to determine the TPF that may correspond to a delay in each toll plaza. The delay in each toll plaza may be factored by adding the time delay due to one or more reasons, such as lane closure in the toll plaza, equipment breakdown, employee absenteeism, system degradation, or other reasons, to the base value calculated. The TPF may be calculated based on a Time Window Factor.

Time taken to cross a segment in the toll way 'W' is a sum of the time taken to travel the distance and the waiting time at the toll plaza at the end of the segment. Such waiting time is one of the contributors to the segment time and may be accounted for by the TPF.

The TPF determination module 218 may trigger an algorithm with toll plaza ID as 'n' and Time Window as 'WTW' and determine the normal waiting time at the next toll plaza given by 'n+1' for tdwmy time window and the current average waiting time in the last 120 minutes of triggering the algorithm. The TPF determination module 218 may take the difference between the two delays as a deviation from normal and assign to the TPF.

For ETC which are Outside Time Window 'OTW', the TPF determination module 218 may determine the normal waiting time at the next toll plaza given by 'n+1' at the expected crossing time of the tracked vehicle 106, based on the tdwmy time window. If there is an ongoing delay in the next Toll Plaza, the ETC system 112 may be aware of the reason and will know how long it will take to return to normalcy.

By way of an example, if an employee is absent on one shift, then the delay is confined only to that one shift. The delay will persist for about 8 hours (1 shift) and then it will gradually get back to normal, for example, in 2 hours. In such case, 'Persistence of delay' may be 8+2=10 hours. At the expected crossing time of the tracked vehicle 106, if the toll plaza will return to normalcy, then this delay will not be factored. If the toll plaza will be running with delay at the expected crossing time of the tracked vehicle 106, then it needs to be factored into the predicted time to cross that segment t[n][n,n+1]. This value will be zero when sufficient data is not available to calculate the value.

The error correction module 220 may comprise suitable logic, circuitry, and interfaces that may be configured to determine a prediction error that corresponds to a difference between actual time taken and the predicted time. When the tracked vehicle 106 crosses an ETC, for example, the first ETC 112a, it makes a prediction of time it will take to cross each of the downstream segments at that point, which includes the current segment. When the current segment is crossed, there is an opportunity to compare the actual time taken and the predicted time for the current segment. Such difference between the actual time taken and the predicted time is the error in the prediction.

When the tracked vehicle 106 crosses the toll plaza 'n', it will make a prediction on the time it will take to cross the current segment it entered, which is [n,n+1]. This is used to calculate the Expected Crossing Time, 'EXP_CR_TM[n][n+1]'. When the tracked vehicle 106 crosses the toll plaza 'n+1', the actual time taken to cross this segment, 'ACT_CT_TM[n+1]', may be determined. The error correction module 220 may determine the error in prediction based on the difference between EXP_CR_TM[n][n+1] and ACT_CT_TM[n+1], expressed as:

$$ER[n+1]=\text{corrFac}\times(ACT\_CR[n+1]-EXP\_CR\_TM[n][n+1]),$$

where corrFac will indicate the percentage of error that needs to be corrected. Its value will be arrived based on data.

Such error should be factored into the next prediction that will run when the tracked vehicle 106 crosses toll plaza 'n+1'.

In general, for a toll plaza 'n', the error correction may be expressed as:

$$ER[n]=\text{corrFac}\times(ACT\_CR[n]-EXP\_CR\_TM[n-1][n])$$

When the tracked vehicle 106 crosses the toll plaza 'n', the error is calculated at that point and factored into its prediction of expected crossing time for EXP_CR_TM[n][n+1]. Since EXP_CR_TM for other toll plazas in that iteration are based on the EXP_CR_TM[n][n+1], it is required to be factored only once per iteration and that is at toll plaza 'n+1'.

Such value may be zero when sufficient data is not available to calculate the value.

The driver factor determination module 222 may comprise suitable logic, circuitry, and interfaces that may be configured to determine factors, such as driving style and pattern, of each driver. Such driving patterns have impact on the ETA. For example, some of them would like to go ahead of other vehicles, some of them would stick together with other trucks and go as a group, some of them may let other trucks pass them and prefer to go slower, and professional drivers that tend to drive at a constant speed and are generally complaint to regulations. The driver factor determination module 222 may identify such patterns and take them into consideration while predicting their ETA at toll plaza 'n'.

1-Segment Pattern: If the tracked vehicle 106 has been in the toll way 'W' only for one segment at the point of running the algorithm, then 1-Segment approach is followed by the driver factor determination module 222, as under:
  1. Create a list (LST1) of the first plurality of vehicles 108 that have been in the segment [n−1,n] at the same time window as the tracked vehicle 106 and crossed ETC ('n') ahead of the tracked vehicle 106 within 60 minutes of the tracked vehicle 106, which should be noted as a configurable parameter.
  2. Calculate the average actual time, 'AVE ACT_SaSi_TM[n−1,n]', taken by the vehicles in LST1 to cross the segment [n−1,n].
  3. Determine the actual time, 'ACT_TBT_TM[n−1,n]' taken by the tracked vehicle 106 to cross the same segments.
  4. Calculate the difference between ACT_TBT_TM[n−1,n] and AVE_ACT_SaSi_TM[n 1,n], referred to as Driver Deviation, 'DRC_DEV[n−1][n]' for this segment [n−1,n]. It can be a negative or positive value, based on the tracked vehicle 106 being slower or faster than other SaSi vehicles in the same segment and in the same time window.

2-Segment Pattern: If the tracked vehicle 106 has been in the toll way 'W' for two segments at the point of execution of the algorithm, then 2-Segment approach is followed by the driver factor determination module 222, as under:
  1. Create a list 'LST1' of the first plurality of vehicles 108 that have been in the segment [n−1,n] at the same time window as the tracked vehicle 106 and crossed toll plaza 'n' ahead of the tracked vehicle 106 within 60 minutes of the tracked vehicle 106. The time period of 60 minutes is a configurable parameter and should not be construed to be limiting the scope of the disclosure.
  2. Calculate the average actual time, 'AVE ACT_SaSi_TM[n−1,n]', taken by the vehicles in the list 'LST1' to cross the segment [n−1,n].
  3. Determine the actual time taken, ACT_TBT_TM[n−1,n]', by the tracked vehicle 106 to cross the same segments.

4. Calculate the difference between ACT_TBT_TM[n−1, n] and AVE_ACT_SaSi_TM[n−1,n], referredto as 'DRC_DEV_INT[n−1][n]' for this segment [n−1,n].
5. Create a list 'LST2' of the first plurality of vehicles 108 that have been in the segment [n−2,n−1] at the same time window as the tracked vehicle 106 and crossed toll plaza ('n−1') ahead of the tracked vehicle 106 within 120 minutes of the tracked vehicle 106. The time period of 120 minutes is a configurable parameter and should not be construed to be limiting the scope of the disclosure.
6. Calculate the average actual time taken, 'AVE_ACT_SaSi_TM[n−2,n−1]', by the vehicles in the list 'LST2' to cross the segment [n−2,n−1].
7. Determine the actual time taken, ACT_TBT_TM[n−2, n−1]', by the tracked vehicle 106 to cross the same segments and calculate the difference between ACT_TBT_TM[n−2,n−1] and AVE_ACT_SaSi_TM [n−2,n−1], referred to as Driver Deviation, 'DRC_DEV_INT[n−2,n−1]', for this segment [n−2,n−1].

Thus, for the 2-Segment method, the Driver Deviation is a combination of deviation in the previous segment and the one before the previous, with different weightage assigned for each:

DRC_DEV[n−1][n]=A*DRC_DEV_INT[n−1][n]+ B*DRC_DEV_INT[n−2,n−1]][n]

where 'A' and 'B' are weightage given to deviation in the previous segment and the one before previous. For an initial calculation 0.8 and 0.2 can be taken as values for 'A' and 'B respectively.
More precise values will be arrived based on studies of historical data. This value will be zero when sufficient data is not available to calculate the value.
In addition to the above, the driver factor determination module 222 may follow a 3-Segment Pattern and 3 Plus Segment Pattern approach.
The selection module 224 may comprise suitable logic, circuitry, and interfaces that may be configured to select a specific segment algorithm for a given segment and a given iteration based on the data available at the point of executing the algorithm. Input parameter for the selection module 224 may be the following:
Method: This parameter can take the values—"Statistical" or "Machine Learning".
Location: Sender Location 'S', Receiver Location 'R', and toll plaza ID 'n'. The Sender Location 'S', Receiver Location 'R' may be in the form of postal address or geo location.
Type of Time: Actual crossing time, 'ACT_CT_TM' and Expected crossing time, 'EXP_CR_TM', of an event.
Event Time: Date and Time at which the event occurred along with time zone License Plate: License Plate number of the tracked vehicle 106.
Vehicle Attributes: A list of attributes of the tracked vehicle 106. It is defined by technical specification of vehicle containing, Single Chassis/Tractor-trailer, Number of axles, Number of tyres, turning radius, and the like. Details are enlisted in the Table 1.
Optional Parameters for the selection module 224 may be the following:
RFID Tag: ID of RFID tag attached to the tracked vehicle 106, issued by ETC organization.
Driver Details: Driving license number and authority of issue.
Laden Weight: Full, Half, Empty.
Method: The selection module 224 uses "MLMethods" to leverage Machine Algorithms to predict the ETA for the tracked vehicle 106 if the setting is "Machine Learning". However, if the setting is "Statistical", then the selection module 224 uses the following Table 2 to select the suitable algorithm.

TABLE 2

| | | Time Window Factor | | |
|---|---|---|---|---|
| | | Within-Time-Window(WTW) | Extended-Time-Window (EXTW) | Outside-Time-Window (OTW) |
| Vehicle Factor Type | SaSi | SaSi-WithinTime-Window | SaSi-ExtendedTime-Window | SaSi-OutsideTime-Window |
| | Non-SaSi | NonSaSi-Within-TimeWindow | NonSaSi-Extended-TimeWindow | NonSaSi-Outside-TimeWindow |

Time Window: When the selection module 224 is invoked, the first factor chosen in the "Statistical" method is Time Window, which is decided based on the input value for Type of Time. The Type of Time at which this event occurred can have two possible values—Actual Crossing Time, 'ACT_CT_TM', or Expected Crossing Time 'EXP_CR_TM'.

1) For the 'ACT_CT_TM' input value, 'WTW' may be assigned as the value for the Time Window factor.
2) For the 'EXP_CR_TM' input value, using the current time when the algorithm is run, the difference between current time and the 'EXP_CR_TM', referred to as Crossing Lag, may be calculated. If the Crossing Lag is less than or equal to 'WTW' (Default is 120 minutes which is a configurable parameter), then 'WTW' may be assigned as the value for Time Window factor.
3) If Crossing Lag is between 2 hours and 8 hours, which is a configurable parameter, then 'EXTW' may be assigned as the value for Time Window factor.
4) If the difference between current time and 'EXP_CR_TM' is beyond 8 hours, which is a configurable parameter, then 'OTW' is assigned as the value for Time Window factor.

Vehicle Type: When the selection module 224 is invoked, the second factor to be considered in Statistical method is Vehicle Type. Based on the Time Window chosen in the first step, SaSi vehicles in that window and that segment may be retrieved from an ETC database. If one or more SaSi vehicles are available in that Time Window, then "SaSi" is chosen for Vehicle Type factor.
If SaSi vehicles are not available in that Time Window, then "Non-SaSi" is chosen for Vehicle Type factor.

Once the Time Window Factor and the Vehicle Type are chosen for the given segment and iteration, then the suitable segment algorithm is given by the Table 2, as discussed above.

Algorithms for some of the common scenarios are listed below. Names of the algorithm are derived based on the values of factors discussed above: VehicleType-TimeWindow.

The segment computation module 226 may comprise suitable logic, circuitry, and interfaces that may be configured to compute calculate the time taken for a given segment between two toll plazas 'l' and 'k+1'. The segment computation module 226 may execute one of a set of segment algorithms from the data storage 216 based on the selection performed by the selection module 224.

The set of segment algorithms give the time taken for the tracked vehicle 106 to travel through a given segment [k,k+1]. A segment algorithm may be invoked by the ETA Algorithm to calculate the end-to-end time. Among them, the algorithm that will be used for a particular segment and for a particular iteration of ETA algorithm may depend on a combination of deciding factors. The selection module 224 may take such deciding factors into consideration and select the suitable segment algorithm for a given segment and iteration.

Deciding Factors:

To calculate segment time for each segment, following factors may be taken into consideration:
1. Method: Two methods are available to find the ETA. One is the statistical method and other is the Machine Learning algorithms. The tracking system 102 may be configured to use any one of these two methods. Based on the configuration, the selection module 224 will select the appropriate algorithm. This is a configurable parameter.
2. Vehicle Type: This factor indicates the type of vehicles used as reference for prediction. If reference vehicle of the same types as the tracked vehicle 106 is available in the time window considered, then we choose "SaSi" algorithm for this factor. Else, we choose "Non-SaSi". Table 1 may to be used to arrive at the correct value
3. Time Window: This factor represents traffic, road and weather conditions while the tracked vehicle 106 is travelling through the segment
   a) SaSi algorithm within Time Window, 'WTW', of the tracked vehicle 106 may be used when there are vehicles that have travelled ahead of the tracked vehicle 106 within 120 minutes, which is a configurable parameter.
   b) SaSi Algorithm outside Time Window, 'OTW', of the tracked vehicle 106 may be used when there are no SaSi vehicles within 480 minutes of the tracked vehicle 106.
   c) SaSi algorithm Extended Time Window, 'EXTW', may be used when there are vehicles between 120 minutes and 480 minutes. This is a linear combination of 'WTW' with extended window and 'OTW' with differing weightages.

ML-Methods(ML):

Such algorithm may be used when the tracking system 102 is configured to use ML algorithms. The configuration may provide two types of information that may help to apply ML techniques—ML algorithms to be used and features to be considered for training model and prediction purpose.

Machine Algorithm

Time-Series algorithm may be used to predict the ETA of vehicles. The tracking system 102 may be configured to use a specific Time-Series algorithm from non-limiting examples, such as Recurrent Neural Network (RNN) algorithms (such as LSTM, Bi-Directional LSTM, and the like), Classical Time-Series algorithms (such as ARIMA, Non-Linear ARIMA), and the like.

Features:

Features are the attributes that impact the prediction of ETA and may be used to train ML models and make predictions, which is a configurable parameter. Candidates for being a "Feature" in the tracking system 102 includes, but are not limited to, Segment ID, Attributes of the vehicles listed in Table 1 (16 Attributes), Time-of-the-day, Day-of-the-week, Week-of-the-Month, Month-of-the year, Traffic Condition, Weather Condition, Road Condition, Toll Plaza Condition, Driver Characteristics, Events impacting road traffic (such as festivals, sports, holidays, political events, social events, religious events, and the like).

SaSi Algorithms

A. SaSi-WithinTimeWindow (SWTW):

SWTW algorithm may be used under following conditions:

Vehicle Type: SaSi vehicles (i.e. the first plurality of vehicles 108) data are available and they are one or more toll plazas ahead of the tracked vehicle 106 at the time of ETC scan for such calculation.

Time Window: SaSi vehicles (i.e. the first plurality of vehicles 108) are available Within Time Window, 'WTW', of the tracked vehicle 106—travelling ahead of the tracked vehicle 106 in the same toll way segment and within 'WTW' minutes of the tracked vehicle 106 (condition for Within Time Window)

Event: The tracked vehicle 106 crossed toll plaza 'n'

Trigger: ETC scan at toll plaza 'n'

Prediction for: Segment between toll plaza 'k' and 'k+1'
1. Create a list, 'Lst1', of all SaSi vehicles, i.e. the first plurality of vehicles 108, that have crossed toll plaza 'k' ahead of the tracked vehicle 106 within 'WTW' minutes (for example, 120 minutes).
2. From the list mentioned above, create another list, 'Lst2', of vehicles that have crossed next toll plaza 'k+2'
3. Find the time taken by all the vehicles in Lst2 to cross the segment between toll plaza 'k' and 'k+1' and calculate their average.
4. The average is the predicted time that will be taken by the tracked vehicle 106 to cross this segment between 'k' and 'k+1' and named t[n][k,k+1], where 'n' indicates the toll plaza that triggered this calculation, and [k,k+1] indicates the segment between the two toll plazas 'k' and 'k+1' for which this prediction is made.

B. SaSi-ExtendedTimeWindow (SEXTW):

SEXTW algorithm may be used under following conditions:

Vehicle Type: SaSi vehicles (i.e., the first plurality of vehicles 108) data are available and they are one or more toll plaza ahead of the tracked vehicle 106 at the time of ETC scan for this calculation Time Window: SaSi vehicles (i.e. the first plurality of vehicles 108) are not available within WTW, but available Within Extended Time Window (EXTW) of the tracked vehicle 106—travelling ahead of the tracked vehicle 106 in the same toll way segment and within Crossing Lag of the tracked vehicle 106.

Event: The tracked vehicle 106 crossed toll plaza named 'n'.

Trigger: ETC scan at toll plaza 'n'.

Prediction for: Segment between toll plaza 'k' and 1+1'.

1. Calculate the Crossing Lag, based on current time and expected crossing time, 'EXP_CR_TM',
2. Create a list, 'Lst1', all SaSi vehicles (i.e., the first plurality of vehicles 108) that have crossed toll plaza 'k' at "Crossing Lag" hours ahead current time
3. From the list Lst1 mentioned above, create a list, 'Lst2', of vehicles that have crossed next toll plaza 'k+1', at current time
4. Find the time taken by all the vehicles in Lst2 to cross the segment between toll plaza 'k' and 'k+1' and calculate their average, 'timeThruExtendedTW'.
5. Find the Segment Time calculated using SaSi-time-of-day-previousday, 'StodP'.
6. If the Crossing Lag is between 2 hours to 4 hours, then give 60% weightage to time-ThruExtendedTW and 40% weightage to time arrived through StodP algorithm. Thus, t[n][k,k+1]=0.6×timeThruExtendedTW+0.4×StodP
7. If the Crossing Lag is between 4 hours to 8 hours, then give 40% weightage to time-ThruExtendedTW and 60% weightage to time arrived through StodP algorithm. Thus, t[n][k,k+1]=0.4×timeThruExtendedTW+0.6×StodP SaSi-time-of-day-previous day (StodP):
StodP algorithm may be used under following conditions:
Vehicle Type: SaSi vehicles (i.e., the first plurality of vehicles 108) data is available.
Time Window: The time is the same time of the previous day as the tracked vehicle 106 crosses the toll plaza and in the same toll way segment. Time window is within 60 minutes of the tracked vehicle 106 crossing 'ACT_CT_TM[n]' or expected crossing 'EXP_CR_TM[n][k]'. For example, if the tracked vehicle 106 crosses or expected to cross a toll plaza at 6 PM on Jul. 17, 2020, then the Time Window is between 5 PM and 6 PM on Jul. 16, 2020.
Event: The tracked vehicle 106 crossed the toll plaza named 'n'.
Trigger: ETC scan at toll plaza 'n'.
Prediction for: Segment between toll plaza 'k' and 'k+1'.
1. Create a list, 'Lst1', of all SaSi vehicles (i.e., the first plurality of vehicles 108) that have crossed toll plaza 'k' within 60 minutes of the same time on the previous day.
2. Find the time taken by all the vehicles in the list, 'Lst1', to travel between toll plaza 'k' and the next toll plaza 'k+1 and calculate the average time taken.
3. The average is the time predicted to be taken by the tracked vehicle 106 to cross segment between 'k' and 'k+1' based time-of-day algorithm and represented by t[n][k,k+1].

C. SaSi-OutsideTimeWindow (SOTW):
SOTW algorithm may be used under following conditions:
Vehicle Type: SaSi vehicles (i.e., the first plurality of vehicles 108) data is available.
Time Window: SaSi vehicles (i.e., the first plurality of vehicles 108) are not available within 'WTW' and 'EXTW', but are available Outside Time Window, 'OTW', of the tracked vehicle 106. There are no SaSi vehicles (i.e., the first plurality of vehicles 108) available within 480 minutes of the tracked vehicle 106.
Event: The tracked vehicle 106 crossed toll plaza named 'n'
Trigger: ETC scan at toll plaza 'n'
Prediction for: Segment between toll plaza 'k' and 'k+1'
1. Calculate predicted time using StodP algorithm, 't_from_StodP', for this segment.
2. Calculate predicted time using Sdow algorithm, 't_from_Sdow', described below, for this segment.
3. Calculate predicted time using Stdwmy algorithm, 't_from Stdwmy', described below for this segment.
4. Predicted time for this segment is given by the following expression:

$$t[n][k,k+1] = X \cdot t\_from\_StodP + Y \cdot t\_from\_Sdow + Z \cdot t\_from\_Stdwmy$$

where X, Y and Z are weightage for each algorithm and its values are arrived after studying historical data SaSi-day-of-week (Sdow):
Sdow algorithm may be used under following conditions:
Vehicle Type: SaSi vehicles (i.e., the first plurality of vehicles 108) data is available.
Time Window: The time is the same time of the day on the same day of the week as the tracked vehicle 106 crosses the toll plaza and in the same toll way segment. Time window is within 60 minutes of the tracked vehicle 106 crossing 'ACT_CT_TM[n]' or expected crossing 'EXP_CR_TM[n][k]'. For example, if the tracked vehicle 106 crosses or expected to cross a toll plaza at 6 PM on Jul. 17, 2020 which is Saturday, then the Time Window is between 5 PM and 6 PM of previous Saturday which is Jul. 10, 2020.
Event: The tracked vehicle 106 crossed the toll plaza named 'n'
Trigger: ETC scan at toll plaza 'n'
Prediction for: Segment between toll plaza 'k' and 'k+1'
1. Create a list, 'Lst1', all SaSi vehicles (i.e., the first plurality of vehicles 108) that have crossed toll plaza 'k' within 60 minutes of the same time and same day of the previous week.
2. Find the time taken by all the vehicles in Lst1 to travel between toll plaza 'k' and the next toll plaza 'k+1 and calculate the average time taken.
3. This average is the time predicted to be taken by the tracked vehicle 106 to cross segment between 'k' and 'k+1' based the day-of-week algorithm and represented by t[n][k,k+1].

SaSi-tdwmy(Stdwmy):
Stdwmy algorithm may be used under following conditions:
Vehicle Type: SaSi vehicles (i.e., the first plurality of vehicles 108) data is available
Time Window: The time is the same time of the day, same day-of-week, same week-of-month and same month-of-year, in the previous year as the tracked vehicle 106 crosses the toll plaza and in the same toll way segment. Time window is within 60 minutes of the tracked vehicle 106 crossing 'ACT_CT_TM[n]' or expected crossing 'EXP_CR_TM[n][k]'. For example, if the tracked vehicle 106 crosses or expected to cross a toll plaza at 6 PM on Jul. 17, 2021 which is the $3^{rd}$ Saturday in July, then the Time Window is between 5 PM and 6 PM on Jul. 18, 2020, which is the $3^{rd}$ Saturday of July in the previous year.
Event: The tracked vehicle 106 crossed the toll plaza named 'n'
Trigger: ETC scan at toll plaza 'n'
Prediction for: Segment between toll plaza 'k' and 'k+1'
1. Create a list, 'Lst1', of all SaSi vehicles (i.e., the first plurality of vehicles 108) that have crossed toll plaza 'k' within 60 minutes of the same time of the day, same day-of-week, same week-of-month and same month-of-year of the previous year.
2. Find the time taken by all the vehicles in the list, 'Lst1', to travel between toll plaza 'k' and the next toll plaza 'k+1 and calculate the average time taken 3. This average is the time predicted to be taken by the tracked vehicle 106 to cross segment between 'k' and 'k+1' based on Stdwmy algorithm and represented by t[n][k,k+1].

Non-SaSi Algorithms

Non-SaSi algorithms may use speed differentials method or speed ratio method between cars and trucks. Speed differentials is the difference between average speed of cars and trucks and are available for various states in specific countries, such as the US. A sample representation is given in Table 3 below, collected from a report "Empirical Analysis of Truck and Automobile Speeds on Rural Interstates: Impact of Posted Speed Limits" published by American Transportation Research Institute. Non-SaSi algorithms given below use speed differential method. Similar formulae are available for speed ratio as well.

Though primary use of this algorithm is in non-toll way roads, it can also be used in toll way roads when SaSi vehicles (i.e., the first plurality of vehicles 108) are not available in the dataset. As a result, the term segment in this algorithm may represent a road on the toll way or non-toll way.

Trigger: Two possible triggers based on the which of the three events mentioned above happened:

For event (a) mentioned above, a trigger is sent from computer system of the sender indicating the start of the trip.

For event (b) and (c) mentioned above, the trigger is the ETC scan at last toll plaza 'n'

Prediction for: Segment between toll plaza 'k' and 'k+1'
1. Using SaSiWTW algorithm and vehicle type as "Car", arrive at the segment time, 'SegTimeCar'.
2. Calculate the reciprocal of 'SegTimeCar', 'ReciprocalSegTimeCar'.
3. Retrieve the Speed differential from the Table 3, for the state and highway of the given segment.
4. Divide the distance of the segment by speed differential to get the extra time taken by the truck, 'DifferentialTime'.
5. Subtract the 'DifferentialTime' from 'ReciprocalSegTimeCar'.
6. Calculate the reciprocal of the result from subtraction, which gives the Segment Time of the tracked vehicle 106 using this algorithm.

B. NonSaSi-ExtendedTimeWindow(NEXTW):

TABLE 3

| State | Hwy | Speed Limits Trucks | Speed Limits Cars | Sample Size Trucks | Sample Size Cars | Average Speed Trucks | Average Speed Cars | Std Dev Trucks | Std Dev Cars | 85th % Speed Trucks | 85th % Speed Cars | Compliance Trucks | Compliance Cars | Differential |
|---|---|---|---|---|---|---|---|---|---|---|---|---|---|---|
| CA | I-5 | 55 | 70 | 277 | 213 | 61.2 | 72.6 | 3.62 | 4.78 | 65 | 77 | 3.2 | 8.9 | 11.4 |
| IL | I-57 | 55 | 65 | 262 | 878 | 64.2 | 73.2 | 4.00 | 5.67 | 68 | 79 | 0.0 | 7.2 | 9 |
| OR | I-57 | 11.4 | 65 | 273 | 288 | 60.9 | 70 | 2.87 | 4.52 | 64 | 75 | 1.5 | 14.9 | 9.1 |
| WA | I-5 | 60 | 70 | 139 | 111 | 63.3 | 71.7 | 3.04 | 4.07 | 67 | 76 | 17.3 | 34.2 | 8.4 |
| WA | I-5 | 60 | 70 | 154 | 146 | 64.5 | 71.6 | 2.67 | 3.52 | 67 | 75 | 22 | 35.6 | 7.1 |
| WA | I-5 | 60 | 70 | 246 | 159 | 62.9 | 72.9 | 3.28 | 4.09 | 66 | 76 | 22 | 26.4 | 10 |
| CT | I-395 | 65 | 65 | 184 | 129 | 66.4 | 72.7 | 3.8 | 4.53 | 70 | 78 | 45.2 | 5.4 | 6.3 |
| CT | I-84 | 65 | 65 | 156 | 144 | 66 | 73.6 | 3.16 | 5.21 | 69 | 78 | 50 | 5.6 | 7.6 |
| CT | I-95 | 65 | 65 | 212 | 121 | 66.1 | 72 | 3.44 | 4.68 | 70 | 70 | 43.4 | 8.6 | 5.9 |
| SC | I-85 | 65 | 65 | 433 | 574 | 67.2 | 69.9 | 4.12 | 5.29 | 71 | 76 | 35.1 | 20.6 | 2.7 |
| AR | I-40 | 65 | 70 | 169 | 362 | 66.7 | 73.5 | 3.69 | 4.32 | 70 | 78 | 32.5 | 21.8 | 6.8 |
| SC | I-26 | 70 | 70 | 276 | 588 | 69 | 72.5 | 4 | 5.32 | 73 | 77 | 64.5 | 28.6 | 3.5 |
| MO | I-44 | 70 | 70 | 247 | 611 | 68.6 | 72.6 | 4.55 | 4.95 | 73 | 77 | 69.6 | 31.4 | 4 |
| TX | I-40 | 70 | 70 | 131 | 89 | 68.6 | 71.4 | 3.63 | 3.98 | 72 | 75 | 76.3 | 75.3 | 2.8 |
| OK | I-40 | 70 | 70 | 168 | 173 | 69.4 | 72.9 | 3.38 | 3.84 | 72 | 76 | 57.7 | 38.7 | 3.5 |
| NM | I-25 | 75 | 75 | 36 | 120 | 68.9 | 76.8 | 5.97 | 4.24 | 75 | 81 | 86.1 | 38.3 | 7.9 |
| NM | I-40 | 75 | 75 | 276 | 239 | 68 | 75.5 | 4.2 | 4.75 | 73 | 80 | 98.2 | 51.1 | 7.5 |
| SD | I-90 | 75 | 75 | 193 | 213 | 67 | 74.7 | 4 | 4.21 | 71 | 79 | 98.9 | 54.9 | 7.7 |
| WY | I-90 | 75 | 75 | 140 | 164 | 69.8 | 75.3 | 4.85 | 4.45 | 75 | 79 | 91.4 | 47.9 | 5.5 |

A. NonSaSi-WithinTimeWindow (NWTW):

When SaSi vehicles (i.e., the first plurality of vehicles 108) are not available, then this algorithm will be used.

Vehicle Type: SaSi vehicles (i.e., the first plurality of vehicles 108) data is not available.

Time Window: SaSi vehicles (i.e., the first plurality of vehicles 108) are not available and non-SaSi vehicles (i.e., the second plurality of vehicles 110) are available Within Time Window, 'WTW', of the tracked vehicle 106—travelling ahead of the tracked vehicle 106 in the same segment and within 'WTW' minutes of the tracked vehicle 106.

Event: There are 3 scenarios this algorithm will be used:
 a) The tracked vehicle 106 started from the sender location 'S' and travelling in non-toll way road.
 b) The tracked vehicle 106 crossed the last toll plaza in the trip and entering into nontoll way road to reach the receiver location 'R'.
 c) The tracked vehicle 106 crossed the last toll plaza in the current toll way and entering into non-toll way road to switch to next toll way road.

Vehicle Type: SaSi vehicles (i.e., the first plurality of vehicles 108) data is not available.

Time Window: SaSi vehicles (i.e., the first plurality of vehicles 108) are not available and non-SaSi vehicles (i.e., the second plurality of vehicles 110) are available Within Extended Time Window, 'EXTW', of the tracked vehicle 106—travelling ahead of the tracked vehicle 106 in the same toll way segment and within Crossing Lag of the tracked vehicle 106.

Event: There are two scenarios this algorithm will be used:
 a) the tracked vehicle 106 crossed the last toll plaza in the trip and entering into nontoll way road to reach the receiver location, 'R'.
 b) the tracked vehicle 106 crossed the last toll plaza in the current toll way and entering into non-toll way road to switch to next toll way road.

Trigger: Two possible triggers based on the which the two events mentioned above happened:

For event (a) and (b) mentioned above, the trigger is the ETC scan at last toll plaza 'n'

Prediction for: Segment between toll plaza 'k' and 'k+1'

1. Using SaSiEXTW algorithm and vehicle type as "Car" arrive at the segment time, 'SegTimeCar'.
2. Calculate the reciprocal of 'SegTimeCar', 'ReciprocalSegTimeCar'.
3. Retrieve the speed differential from the Table 3, as described above, for the state and highway of the given segment.
4. Divide the distance of the segment by speed differential to get the extra time taken by the truck, 'DifferentialTime'.
5. Subtract the 'DifferentialTime' from 'ReciprocalSegTimeCar'.
6. Calculate the reciprocal of the result from subtraction, which gives the segment time of the tracked vehicle 106 using this algorithm.

C. NonSaSi-OutsideTimeWindow(NOTW):
Vehicle Type: SaSi vehicles (i.e., the first plurality of vehicles 108) data is not available
Time Window: SaSi vehicles (i.e., the first plurality of vehicles 108) are not available and non-SaSi vehicles (i.e., the second plurality of vehicles 110) are available Outside Time Window, 'OTW' of the tracked vehicle 106
Event: There are two scenarios this algorithm will be used:
  1. The tracked vehicle 106 crossed the last toll plaza in the trip and entering into non-toll way road to reach the receiver location, 'R'.
  2. The tracked vehicle 106 crossed the last toll plaza in the current toll way and entering into non-toll way road to switch to next toll way road.
Trigger: Two possible triggers based on the which the two events mentioned above happened: For event (a) and (b) mentioned above, the trigger is the ETC scan at last toll plaza 'n'
Prediction for: Segment between toll plaza 'k' and 'k+1'
  1. Using SaSiOTW algorithm and vehicle type as "Car" arrive at the segment time, 'SegTimeCar'.
  2. Calculate the reciprocal of 'SegTimeCar', 'ReciprocalSegTimeCar'.
  3. Retrieve the Speed differential from the Table 3, as described above, for the state and highway of the given segment.
  4. Divide the distance of the segment by speed differential to get the extra time taken by the truck, 'DifferentialTime'.
  5. Subtract the 'DifferentialTime' from 'ReciprocalSegTimeCar'.
  6. Calculate the reciprocal of the result from subtraction, which gives the segment time of the tracked vehicle 106 using this algorithm.

The location finder 228 may comprise suitable logic, circuitry, and interfaces that may be configured to find the geo location of the tracked vehicle 106 at any point of time during the journey of the tracked vehicle 106. The geo location may be found based on various parameters, such as last scanned location (n), timestamp 'ACT_CT_TM[n]', current time, and the like. Most recent scan of ETC may provide a Crossing Data, which may contain the toll plaza ID of the last scan and the timestamp of the last scan. The toll plaza ID 'n' maps to a specific physical location of the toll plaza in the toll way 'W'. It can be represented in terms of geo-location (latitude and Longitude) to align with GPS co-ordinates. A difference between the last scanned timestamp and the current time may provide the time elapsed, 'tElapsed', since the last scan.

In accordance with an embodiment, the predicted speed of the tracked vehicle 106 in that particular segment may be calculated using segment algorithm, distance between the last scanned toll plaza and the next toll plaza and the wait time in the next toll plaza. The segment algorithm to be used may be selected by the selection module 224. It can be one of the 3—SaSi-WithinTimeWindow (SWTW), NonSaSi-WithinTimeWindow (NWTW) and ML-Methods(ML).

In accordance with an embodiment, 'tElapsed' may be multiplied with the predicted speed to give the distance travelled by the tracked vehicle 106 during 'tElapsed' time, represented by 'dsDuringElapsedTime'. A point may be marked on the toll way which is 'dsDur-ingElapsedTime' away from the toll plaza 'n' and that is the predicted current location of the tracked vehicle 106.

The privacy protection module 230 may comprise suitable logic, circuitry, and interfaces that may be configured to preserve the privacy of a vehicle owner based on their authorization to use the data of corresponding vehicle data whenever it is shared with other stakeholders. Examples of the vehicle data may include, but are not limited to, vehicle trip details (such as, start location, end location, route, toll plaza in the route, weight and type of cargo carried), vehicle tracking details (such as, RFID attached to the vehicle, ETC Scans at toll plazas, location and ETA predictions at different time during the trip, speed and waiting times), vehicle details (such as License Plate Number, DMV registration, and Vehicle Attributes listed in Table 1), and driver details (such as driving license number, issuing authority, and driving records). The privacy protection module 230 may share the data only on a need-to-share basis. The privacy protection module 230 may provide both fine-grained and coarse-grained control of data sharing. The vehicle owner is fully informed on which data has been shared, to whom and for what purpose. At any point, the vehicle owner may revoke their authorization at a very short notice, either through mobile interface 202 or other user-interface, such as the web interface 204.

In operation, vehicles which have same or similar vehicle characteristics as the tracked vehicle 106, travelling in the same segment of the toll way 'W', travelling under the same or similar weather, traffic and road conditions as the tracked vehicle 106 (deduced by vehicles travelling in the same time window as the tracked vehicle 106 (within 'w' minutes of the tracked vehicle 106, which is a configurable parameter)), and having the same driver characteristics as the tracked vehicle 106 (deduced by their close correlation to speed of the tracked vehicle 106 in the upstream segments) may have close correlation of speed in downstream segments also.

Such vehicles may be used as reference vehicles for the tracked vehicle 106. Since such vehicles are going ahead of the tracked vehicle 106 by at least one toll plaza, they would have already crossed the current segment [n, n+1] and the time taken by them, t[n][n, n+1], to cross the segment is known at the point of running the algorithm. Such time is the closest prediction for the tracked vehicle 106 to cross segment [n, n+1]. This is the core premise that helps the tracking system 102 to accurately predict the ETA.

In accordance with an embodiment, the vehicles may be outside the time window of the tracked vehicle 106. In such embodiment, the tracking system 102 may use the following conditions for reference vehicles, such as same or similar vehicle characteristics as the tracked vehicle 106, same segment of the toll way 'W', and travelling at the same time-of-day, day-of-week, week-of-month and month-of-year with different weightage for different windows.

In accordance with an embodiment, the segment computation module 226 may calculate the segment time for a given segment by finding the time difference between ETC scans in two consecutive toll plaza for the SaSi vehicles (i.e., the first plurality of vehicles 108) moving ahead of the tracked vehicle 106. This segment time taken from this focused group of reference vehicles, may be the closest to segment time for the tracked vehicle 106, for this particular segment. Such approach is more accurate than other GPS-based algorithms because it takes actual driving time plus the actual waiting time in the toll plaza, in the same time window.

In accordance with various embodiments, the reference vehicles may be found either through statistical methods or through ML algorithms, as described above in detail.

In accordance with an embodiment, the driver factor determination module 222 may be configured to factor driver characteristics by finding how much a driver is deviating from the average speed of other SaSi vehicles (i.e., the first plurality of vehicles 108) in upstream segment and adding such deviation to the predicted value in downstream segments.

In accordance with an embodiment, the TPF determination module 218 may be configured to factor delay in each toll plaza by adding the time delay due to lane closure in the toll plaza, equipment breakdown, system degradation, and the like, to the base value calculated. The delay may be calculated by finding the normal waiting time at the toll plaza for tdwmy time window and the current waiting time while the algorithm is executed. The difference between the two delays may be taken as a deviation from normal and assigned to the TPF.

In accordance with an embodiment, the selection module 224 may be configured to select the SaSi algorithm within time window (WTW) in an event the SaSi vehicles (i.e., the first plurality of vehicles 108) have moved ahead of the tracked vehicle within a defined time period, such as 120 minutes, which is a configurable parameter. In accordance with another embodiment, the selection module 224 may be configured to select the SaSi algorithm outside time window (OTW) in an event no SaSi vehicles (i.e., the first plurality of vehicles 108) have moved ahead of the tracked vehicle within 480 minutes. In accordance with yet another embodiment, the selection module 224 may be configured to select the SaSi algorithm extended time window (EXTW) along with SaSi time-of-day-previous-day (StodP) in an event SaSi vehicles (i.e., the first plurality of vehicles 108) have moved ahead of the tracked vehicle 106 between a time period, such as 120-480 minutes, which is a configurable parameter. In accordance with another embodiment, in an event of the absence of toll road or a journey with presence of non-SaSi vehicles (i.e., the second plurality of vehicles 110), the tracking system 102 may adopt a non-SaSi approach based on speed differentiable method or speed ratio methods, time window, toll plaza delay and driver characteristics, as described above in non-SaSi algorithms.

In accordance with an embodiment, the location finder 228, in conjunction with the ETA prediction module 210 in the computation module 102a of the tracking system 102, may be configured to provide a current predicted position of the tracked vehicle 106, represented as geo co-ordinates (latitude, longitude), for plotting on a map. Described below are exemplary operations for such an implementation:

1: GetLocation request may be serviced while the tracked vehicle 106 has started from the sender location 'S' and not reached the receiver location 'R'. In such a request, various parameters are sent, such as License Plate Number, Start Location, End Location, Route, and Optional Parameters (such as Driver Details: driving license number and authority of issue, and Laden Weight: Full, Half, Empty).

2: When the request is received, the last received Crossing Data may be identified for the tracked vehicle 106. Crossing data will contain the toll plaza ID 'n' where the crossing occurred, timestamp of the crossing, 'ACT CR_TM[n]' and License Plate of the tracked vehicle 106. This represents the most recent status of the tracked vehicle 106 when ETC scan occurred.

3: Database is maintained by the tracking system 102 where the toll plaza ID to geo location mapping is maintained. Such database is looked up and the geo location for toll plaza ID 'n' may be retrieved. This represents the last seen location of the tracked vehicle 106, along with the time at which it was seen.

4: Predicted speed (PS) of the tracked vehicle 106 in the segment [n,n+1] may be determined using the following method:

5: Select a suitable segment algorithm, such as one of SaSiWTW, NonSaSiWTW or ML-Methods, using the selection module 224 for this segment.

6: Determine the Segment time to cross this segment, t[n][n,n+1] using this selected segment algorithm.

7: Retrieve the waiting time (waitTime[n+1]) for vehicles at the next toll plaza n+1.

8: Subtract the waiting time 'waitTime[n][n+1]' from Segment time t[n][n,n+1] to arrive at the timeInMotion. This represent the time when the tracked vehicle 106 was driving or InMotion. timeInMotion[n,n+1]=t[n][n,n+1]−waitTime[n][n+1]

9: Find the distance (ds[n,n+1])between toll plaza 'n' and 'n+1'

10: Divide the distance 'ds[n,n+1]' by timeInMotion[n,n+1] to get the predicted speed (PS[n][n,n+1]) for the segment [n,n+1] when the tracked vehicle 106 crossed toll plaza 'n'

11: Find the time when getLocation request was received, 'curTime'. Subtract crossing time ACT_CT_TM[n] from 'curTime' to get the time elapsed (tElapsed) since the crossing, expressed as:

tElapsed=curTime−ACT_CT_TM[n]

12: Multiply the time elapsed with predicted speed to get the distance (dsDuringElapsedTime) travelled by the tracking vehicle 106 after the last crossing, expressed as:

dsDuringElapsedTime=tElapsed X PS[n][n,n+1]

13: Mark a point along the toll way, which is dsDuringElapsedTime distance away from the toll plaza 'n' which was crossed recently. This point is the current predicted position of the tracked vehicle 106, named 'curPos'. It can be represented as geo co-ordinates (latitude, longitude), which will help in plotting it on a map.

The proposed system and method for predicting the ETA of vehicles may provide various benefits. For example, as the predicted speed is calculated from same type or similar type of vehicles, the accuracy of the prediction at each toll plaza is higher than other tracking systems. The proposed system has complete data of all freight trucks traversed in a given segment of the toll way 'W', in the given time window and hence its accuracy is better than GPS-based system which has only a fraction of that data. Further, for segments which the tracked vehicle 106 crossed in the latest time window, accuracy is the best as it is based on traffic, weather and road conditions which are closest to the tracked vehicle 106. Moreover, for freight trucks which have RFID tag already installed and registered with ETC, the proposed system will cost very less (one-tenth or lesser) compared to GPS-based system, as there is no device cost and no monthly mobile services cost. The proposed system further provides various validations in real-time by third party with high-integrity (called oracle in blockchain industry) using RFID technology. Examples of such validations may include proof-of-travel, proof-of-route (supply-chain decarbonization), and proof-of-compliance to speed regulations. The proposed system may be an alternate technology to the GPS. It can be used as backup system in mission critical tracking, like military vehicles which are critical during GPS blackout. The proposed system is more tamper-proof/hacker-proof relative to GPS. Also, the proposed system is non-intrusive, i.e., no new gadget installation is required. Apart from the above, the proposed system provides better privacy protection and user-authorized data sharing, i.e., vehicle gets tracked only on request.

Figure 3:
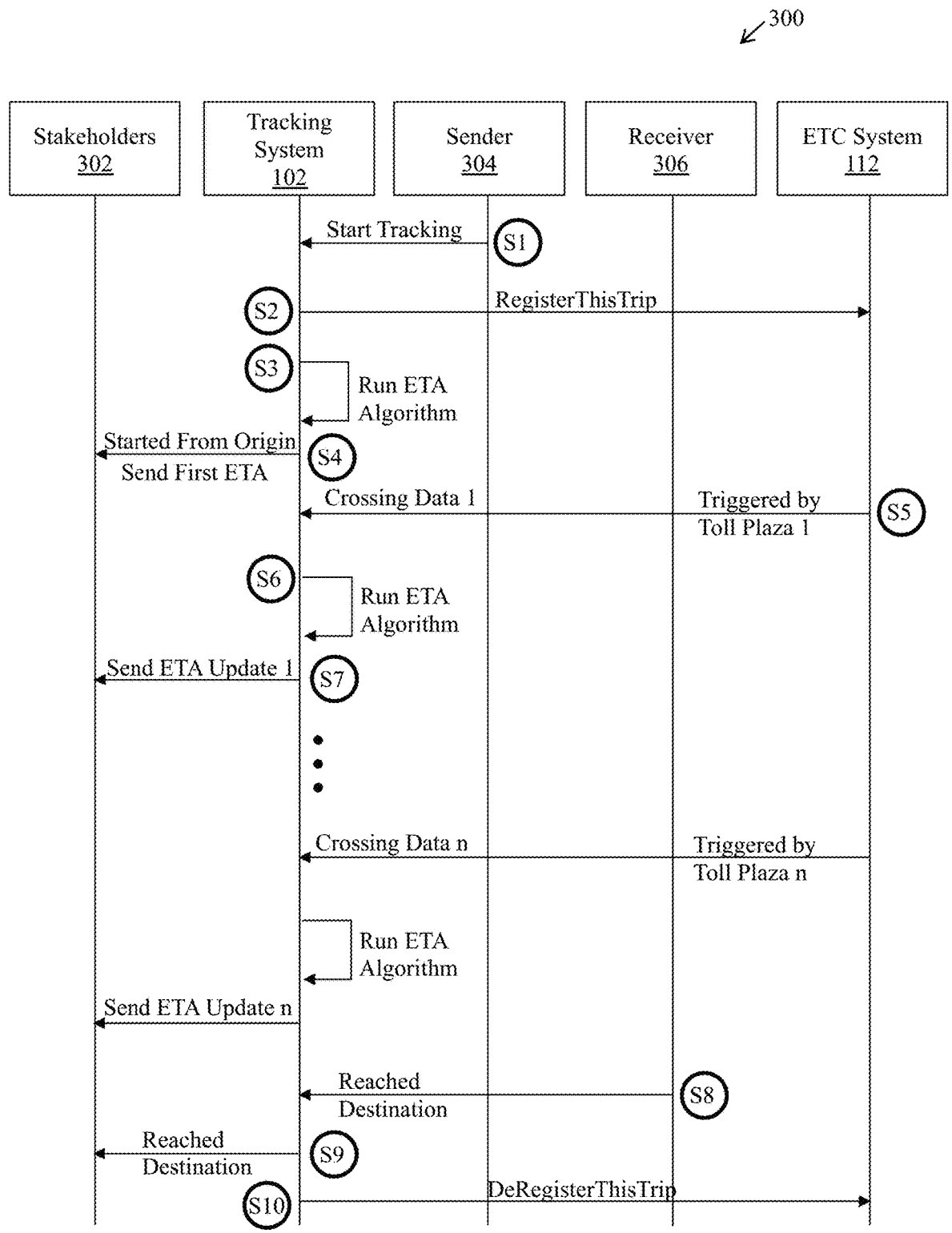
FIG. 3 is a sequence diagram that illustrates the sequence of operations for tracking a tracked vehicle, in accordance with an exemplary embodiment of the disclosure.

FIG. 3 is a sequence diagram 300 that illustrates the sequence of operations for tracking a tracked vehicle, in accordance with an exemplary embodiment of the disclosure. FIG. 3 is described in conjunction with FIGS. 1, 2A and 2B. The sequence diagram 300 depicts an exemplary implementation illustrating an interaction between computer systems of stockholders, facilitated by, for example the Internet, short message service (SMS), application programming interface (API) and other communication and messaging systems provided by the communication network 114. There are shown stakeholders 302, a sender 304, a receiver 306, the tracking system 102, and the ETC system 112. The tracking system 102 interacts with a computer system of the sender 304 (which may correspond to a company or an individual sending freight to the receiver 306 using services of a cargo carrier) for triggers and notification. Similarly, the tracking system 102 interacts with a computer system of the receiver 306 (which may correspond to a company or an individual receiving freight from the sender 304 using services of the cargo carrier) for triggers and notification. The tracking system 102 further interacts with the ETC system 112 to send ETC scan data in real-time or with small delay. The tracking system 102 further interacts with the stakeholders 302, such as the data sources 116 and historical databases, to retrieve data to run the algorithm. For example, the ETC system 112 to map RFID to license plate, the DMV system or the DMV 116d to map license plate to make, model and year, the VMs 116c and the IA/C 116b to map make, model and year with vehicle specification.

It should be noted that the above components of FIG. 3 are for exemplary purposes only. Any number of ETC systems, DMVs, vehicle manufacturers and other stakeholders may co-exist in the same deployment of the tracking system 102, without any deviation from the scope of the disclosure.

All the stakeholders 302 have to be registered with the tracking system 102 and obtain credentials to have access to the tracking system 102. Exchange of messages and requests between computer system of the stakeholders 302 may be implemented using API and notification services commonly used in, for example, distributed software systems.

When the tracked vehicle 106 leaves the sender location 'S', the sender 304 sends a track request to the tracking system 102 to start tracking, indicated by 'S1'. This is the first trigger received by the tracking system 102. The track request may have following information: 1) License plate number; 2) Start Location; 3) End Location; 4) Route containing all Toll Plazas to be crossed; 5) Optional Parameters: RFID tag number; Driver Details: Driving license number and authority of issue; Laden Weight: Full, Half, Empty; and the like.

The tracking system 102 initiates a new trip to track the tracked vehicle 106 and initializes variables related to this trip. The tracking system 102 sends a request to the ETC system 112 to register the trip, indicated by 'S2'.

The tracking system 102 may initiate an event-driven trigger to run the ETA algorithm every time the tracked vehicle 106 crosses a toll plaza during this trip. It runs the ETA algorithm for the first time with data received as part of the track request from the sender 304. Accordingly, the ETA prediction module 210 may execute the ETA algorithm and calculate the ETA, 'ETA_AT[0]', when the tracked vehicle 106 starts from the sender location 'S', indicated by 'S3'. Such prediction may be transmitted to the stakeholders 302, indicated by 'S4', who have registered for the ETA.

In accordance with an embodiment, when the tracked vehicle 106 crosses a toll plaza in the toll way 'W', as indicated by 'S5', the tracking system 102 gets a notification from the ETC system 112 and receives crossing data, that includes the toll plaza ID, time stamp and the license plate number. The tracking system 102 may receive the crossing data from the ETC system 112 by various means, such as directly from the ETC system 112 as an authorized agent of vehicle owner, from the vehicle owner once the vehicle owner receives the notification from the ETC system 112, or from the ETC partners 116a.

Receiving the crossing data from the ETC system 112 may act as a trigger for the tracking system 102 to execute the ETA algorithm by the ETA prediction module 210, as indicated by 'S6'. When the crossing data is received from the ETC system, the ETA prediction module 210 in the tracking system 102 executes the ETA algorithm and predicts the ETA at that point in time and transmits the result to all stakeholders who have registered for the ETA, as indicated by 'S7'. The operations 'S5' to 'S7' are repeated in a loop every time the ETC system 112 performs the ETC scan in a toll plaza when the tracked vehicle 106 crosses a toll plaza. This loop is repeated till the tracked vehicle 106 reaches the receiver location 'R'.

When the final destination, i.e., the receiver location 'R', is reached, the receiver 306 sends a notification to the tracking system 102, indicated by 'S8', based on which the tracking is terminated by the tracking system 102. The tracking system 102 further transmits a notification to the stakeholders 302, indicated by 'S9', and the ETC system 112, indicated by 'S10', about the termination of the tracked vehicle 106.

Steps S1 to S10 in FIG. 3 is one possible implementation of the system. In certain other implementations, one or more of these steps may not be needed and hence will not be executed. In other implementations, few more steps in addition to the ten steps may be needed based on the different scenarios.

It should be noted that the ETA algorithm is triggered by events happening in three locations, i.e., the sender location 'S', the receiver location 'R' and the plurality of toll plazas 104. Aforesaid is one exemplary way to implement an event-driven algorithm.

Figure 4A:
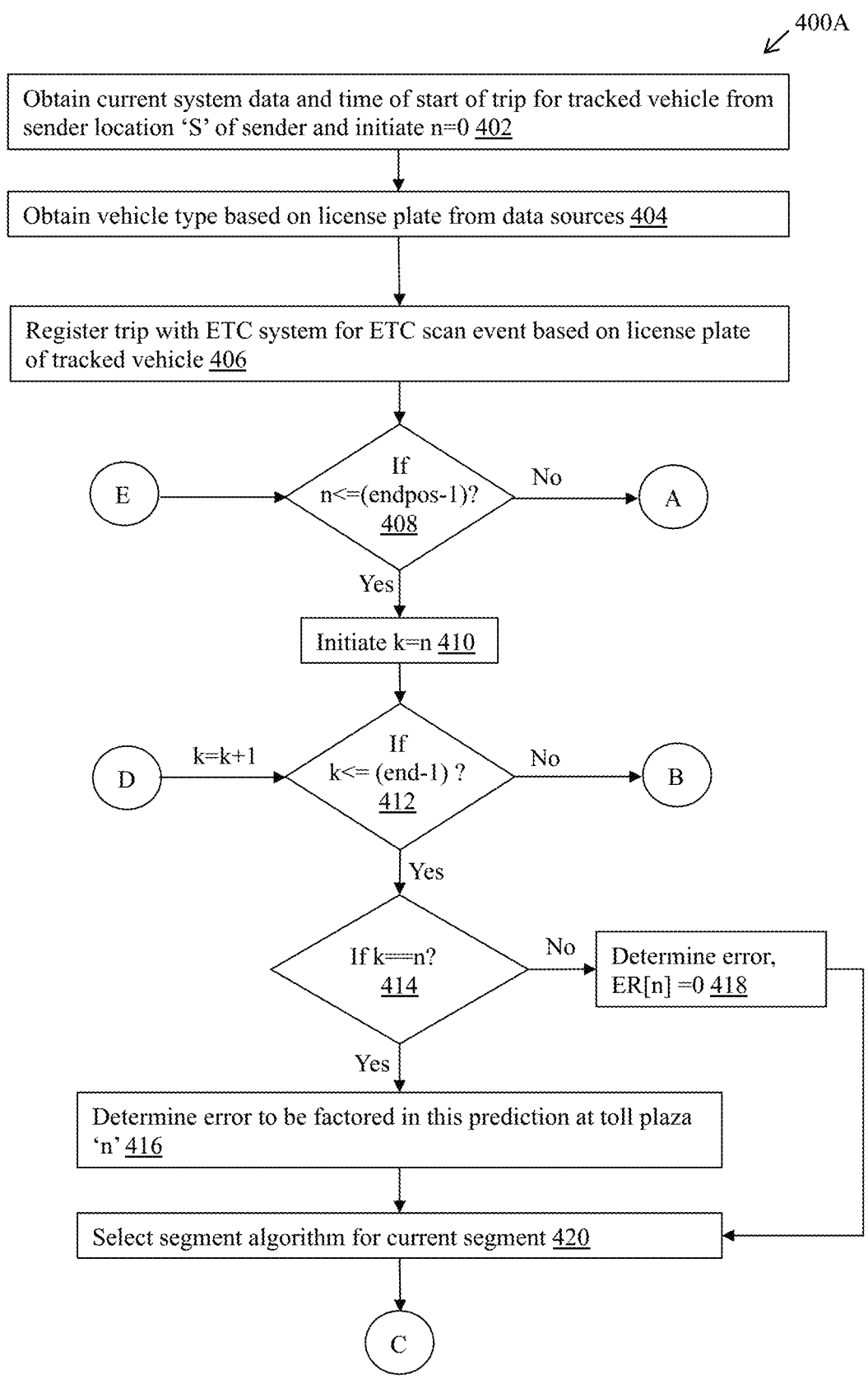
FIGS. 4A and 4B collectively depict flowcharts that illustrate exemplary operations for predicting ETA of vehicles, in accordance with an exemplary embodiment of the disclosure.
Figure 4B:
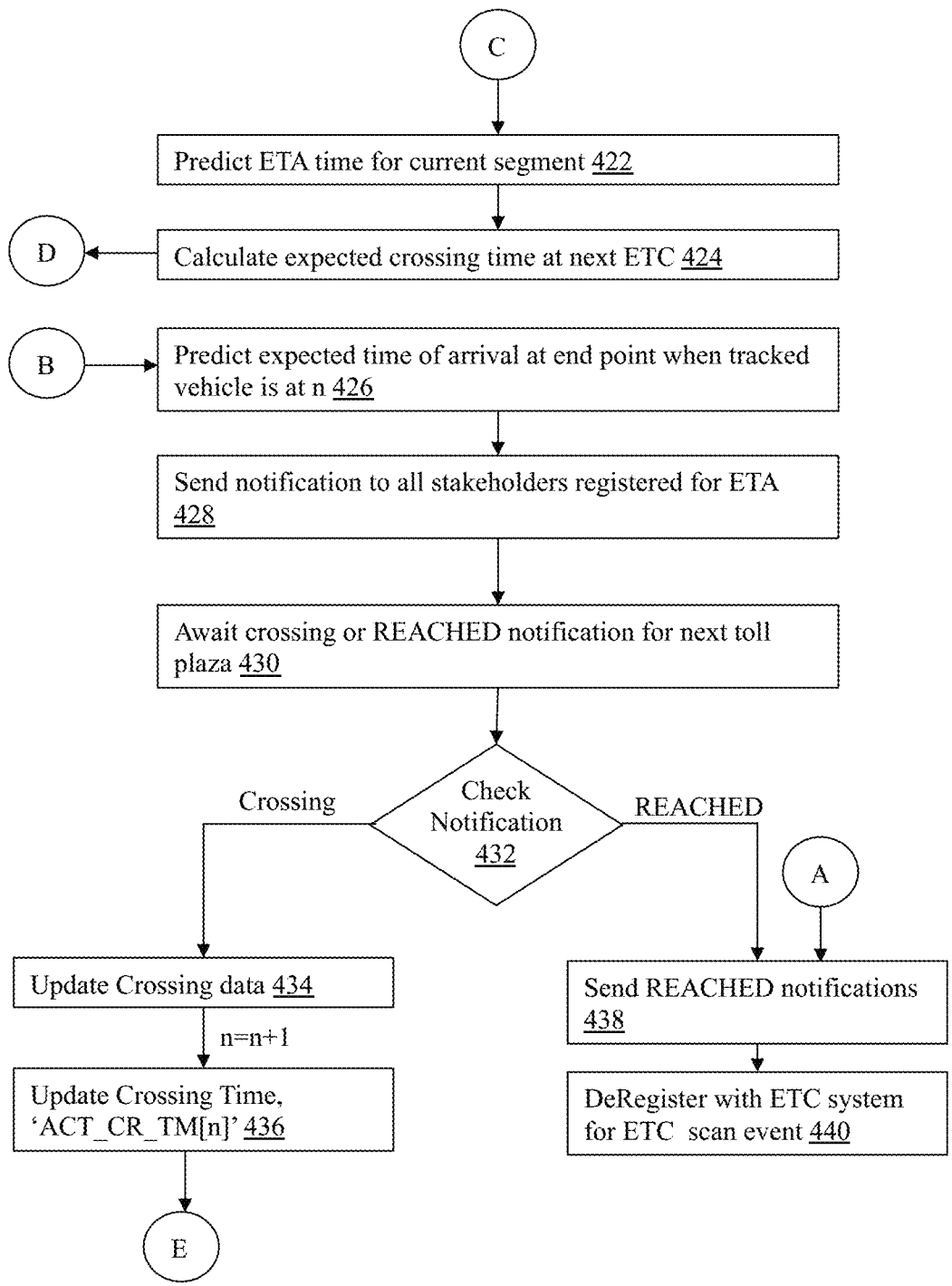

FIGS. 4A and 4B depict flowcharts 400A and 400B respectively, that collectively illustrate exemplary operations for predicting ETA of vehicles, in accordance with an exemplary embodiment of the disclosure. FIGS. 4A and 4B are described in conjunction with FIGS. 1, 2A, 2B, and 3.

Referring to FIG. 4A, at 402, current system data and time of a start of a trip for the tracked vehicle 106 from the sender location 'S' may be obtained and 'n' may be initiated to zero. In accordance with an embodiment, the tracking system 102 may be configured to obtain the current system data and time of the start of the trip for the tracked vehicle 106 from the sender location 'S' of the sender 304. The tracking system

102 may be configured to initiate 'n' to zero, where 'n' corresponds to and n corresponds to toll plaza 'n' where ETC scan is performed. Accordingly, the tracking system 102 may initialize the actual crossing time 'ACT_CT_TM[0]', referred to as the parameter type of time, to current system data and time for the tracked vehicle 106.

At 404, vehicle type factor may be obtained based on the license plate. In accordance with an embodiment, the tracking system 102 may be configured to obtain the vehicle type based on the license plate from Data Sources 116. In accordance with an embodiment, if one or more SaSi vehicles are available in a time window, then the vehicle type factor may be determined as "SaSi". In accordance with an embodiment, if one or more SaSi vehicles are not available in the time window, then the vehicle type factor may be determined as "Non-SaSi".

At 406, the trip may be registered with the ETC system 112 for an ETC scan event based on the license plate of the tracked vehicle 106. In accordance with an embodiment, the tracking system 102 may be configured to register the trip with the ETC system 112 for an ETC scan event based on the license plate of the tracked vehicle 106.

At 408, it may be determined whether n<=(endpos-1). In accordance with an embodiment, the ETA prediction module 210 in the tracking system 102 may be configured to determine whether n<=(endpos-1). 'endpos' corresponds to position of the receiver 306 with respect to the position of the sender 304. In accordance with an embodiment, n<=(endpos-1) and the control passes to 410. In accordance with an embodiment, n>(endpos-1) and the control passes to 438.

At 410, 'k' may be initiated to 'n'. In accordance with an embodiment, the ETA prediction module 210 in the tracking system 102 may be configured to initiate 'k' to 'n', where 'k' corresponds to the toll plaza 'k' from where the current segment starts.

At 412, it may be determined whether k<=(end-1). In accordance with an embodiment, the ETA prediction module 210 in the tracking system 102 may be configured to determine whether k<=(end-1). 'end' corresponds to endpoint. In accordance with an embodiment, k<=(end-1) and the control passes to 414. In accordance with an embodiment, k>(end-1) and the control passes to 426.

At 414, it may be determined whether 'k' equals 'n'. In accordance with an embodiment, the ETA prediction module 210 in the tracking system 102 may be configured to determine whether 'k' equals 'n'. In accordance with an embodiment, when 'k' equals 'n', the control passes to 416. In accordance with another embodiment, when 'k' doesn't equal 'n', the control passes to 418.

At 416, an error to be factored in this prediction is determined at toll plaza 'n'. In accordance with an embodiment, the error correction module 220 in the computation module 102a of the tracking system 102 may be configured to determine an error to be factored into this ETA prediction that will execute when the tracked vehicle 106 crosses this toll plaza 'n'. The control passes to 420. The calculated error may be expressed as:

$$ER[n]=corrFac \times (ACT\_CR[n]-EXP\_CR\_TM[n-1][n])$$

with typeOfTime=ACT_CT_TM, and evtTime=ACT_CT_TM[n] and corrFac will indicate the percentage of error that needs to be corrected. Its value will be arrived based on data.

At 418, an error is determined to be as zero. In accordance with an embodiment, the error correction module 220 in the computation module 102a of the tracking system 102 may be configured to determine an error to be zero. The control passes to 420. The calculated error may be expressed as:

$$ER[n]=0,$$

with typeOfTime=EXP CR_TM, and evtTime=EXP_CR_TM[n][k]

At 420, a segment algorithm may be selected for a current segment. In accordance with an embodiment, the selection module 224 in the computation module 102a of the tracking system 102 may be configured to select segment algorithm for the current segment. The segment algorithm may be selected by the selection module 224 based on various parameters, such as Method ("Statistical" or "Machine Learning"), Location (Sender Location '5', Receiver Location 'R', Toll Plaza ID–'n'), TypeofTime(Actual crossing time (ACT_CT_TM), Expected crossing time (EXP_CR_TM) of event), EventTime (Date and Time at which the event occurred along with time zone, LicensePlate (License Plate number of the tracked vehicle 106, Vehicle-Attributes (such as, technical specification of vehicle containing, Single Chassis/Tractor-trailer, Number of axles, Number of tyres, turning radius, and the like, as enlisted in Table 1), and Optional Parameters (such as RFID Tag, Driver Details, and Laden Weight).

At 422 (FIG. 4B), the ETA time for the current segment may be predicted. In accordance with an embodiment, the ETA prediction module 210, in conjunction with the computation module 102a, of the tracking system 102 may be configured to predict the ETA time for the current segment. In accordance with an embodiment, the predict the ETA time may be expressed as:

$$t[n][k,k+1]=SegAlgo0+DRC\_DEV[n-1][n]+ETC\_DEV[n+1]+ER[n],$$

where SegAlgo( )=AlgoSelector(method, TypeOfTime=typeOfTime, Location=n, Segment=[k, k+1], EventTime=evtTime, VehicleAttributes=vehicleAttributes, OptionalParams=opts)

SegAlgo( ) corresponds to the SaSi and Time window impact,

AlgoSelector( )corresponds to the selection module 224, typeOfTime=ACT_CT_TM, evtTime=ACT_CT_TM[n], ER[n]32 ACT_CT_TM[n]

EXP_CR_TM[n−1][k]     if     k==n,     else typeOfTime=EXP_CR_TM, evtTime=

EXP_CR_TM[n][k], ER[n]=0,

DRC_DEV[n−1][n] corresponds to the driver characteristics,

ETC DEV[n+1] corresponds to the delay in next toll plaza, and

ER[n] corresponds to the error correction.

At 424, expected crossing time at the next ETC may be calculated. In accordance with an embodiment, the ETA prediction module 210, in conjunction with the computation module 102a, of the tracking system 102 may be configured to calculate the expected crossing time at the next ETC. The calculation may be expressed as:

$$EXP\_CR\_TM[n][k+1]=EXP\_CR\_TM[n][k]+t[n][k,k+1]$$

The expected crossing time at the next ETC may be calculated and control passes to 412 (FIG. 4A) by incrementing the value of by value of 1, and the loop continues until k>(end-1).

At 426, expected time of arrival at the end point may be predicted when the tracked vehicle is at n. In accordance with an embodiment, the ETA prediction module 210, in conjunction with the computation module 102a, of the tracking system 102 may be configured to predict the expected time of arrival at the end point when the tracked vehicle is at n, which may be expressed as:

ETA_AT_[n]=EXP_CR_TM[n][endpoint-1]

At 428, notification may be sent to all stakeholders registered for ETA. In accordance with an embodiment, the ETA prediction module 210, in conjunction with the computation module 102*a*, of the tracking system 102 may be configured to send notification to all stakeholders registered for ETA.

At 430, crossing or REACHED notification may be awaited for the next toll plaza. In accordance with an embodiment, the ETA prediction module 210, in conjunction with the computation module 102*a*, of the tracking system 102 may be configured to wait for crossing or REACHED notification for the next toll plaza, which may be expressed as:

evt=waitForEvent( )

At 432, when an event is received it may be determined if it is a crossing or REACHED event. In accordance with an embodiment, the ETA prediction module 210, in conjunction with the computation module 102*a*, of the tracking system 102 may be configured to determine that the event is crossing, and the control passes to 434. In accordance with an embodiment, the ETA prediction module 210, in conjunction with the computation module 102*a*, of the tracking system 102 may be configured to determine that the event is REACHED, and the control passes to 438.

At 434, crossing data may be updated. In accordance with an embodiment, the ETA prediction module 210, in conjunction with the computation module 102*a*, of the tracking system 102 may be configured to update the crossing data based on the following expression:

crossingData=evt.crossingData

Control is passed to 436 after incrementing the value of 'n' by 1.

At 436, Crossing Time, 'ACT_CT_TM[n]', may be updated. In accordance with an embodiment, the ETA prediction module 210, in conjunction with the computation module 102*a*, of the tracking system 102 may be configured to update the crossing time based on the following expression:

ACT_CT_TM[n]=crossingData.crossingTime

Crossing Time, 'ACT_CT_TM[n]', may be updated and the control passes back to 408 (FIG. 4A, and the loop continues until n>(endpos-1).

At 438, REACHED notifications may be sent to registered stakeholders 302. In accordance with an embodiment, the ETA prediction module 210, in conjunction with the computation module 102*a*, of the tracking system 102 may be configured to send REACHED notifications to registered stakeholders 302.

At 440, ETC scan event may be deRegistered with the ETC system 112. In accordance with an embodiment, the ETA prediction module 210, in conjunction with the computation module 102*a*, of the tracking system 102 may be configured to deRegister with the ETC system 112 for ETC scan event. Accordingly, the tracking of the tracked vehicle 106 may be terminated.

Figure 5:
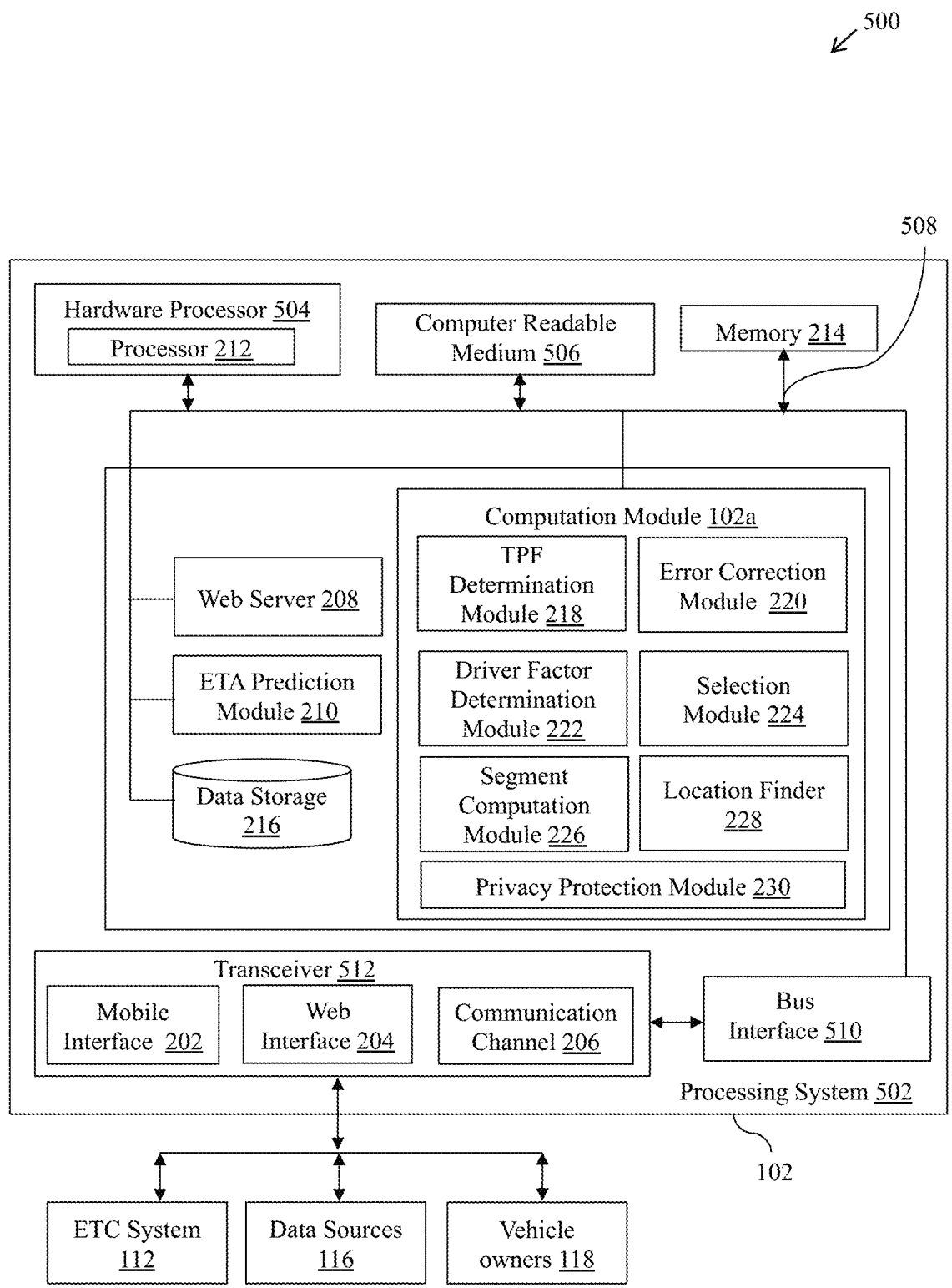
FIG. 5 is a conceptual diagram illustrating an example of a hardware implementation for a system employing a processing system for predicting ETA of vehicles, in accordance with an exemplary embodiment of the disclosure.

FIG. 5 is a conceptual diagram illustrating an example of a hardware implementation for a system employing a processing system for predicting ETA of vehicles, in accordance with an exemplary embodiment of the disclosure. Referring to FIG. 5, the hardware implementation shown by a representation 500 for the tracking system 102 employs a processing system 502 for predicting ETA of vehicles, in accordance with an exemplary embodiment of the disclosure, as described herein.

In some examples, the processing system 502 may comprise a hardware processor 504, a non-transitory computer readable medium 506, a bus 508, a bus interface 510, and a transceiver 512. The processing system 502 may further comprise the mobile interface 202, the web interface 204, the communication channel 206, the web server 208, the computation module 102*a*, the ETA prediction module 210, the TPF determination module 218, the error correction module 220, the driver factor determination module 222, the selection module 224, the segment computation module 226, the location finder 228, and the privacy protection module 230, as described in detail in FIGS. 2A and 2B.

The hardware processor 504 may be configured to manage the bus 508 and general processing, including the execution of a set of instructions stored on the non-transitory computer readable medium 506. The set of instructions, when executed by the hardware processor 504, causes the tracking system 102 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer readable medium 506 may be used for storing data that is manipulated by the hardware processor 504 when executing the set of instructions. The data is stored for short periods or in the presence of power. The non-transitory computer readable medium 506 may also be configured to store data for one or more of the mobile interface 202, the web interface 204, the communication channel 206, the web server 208, the computation module 102*a*, the ETA prediction module 210, the TPF determination module 218, the error correction module 220, the driver factor determination module 222, the selection module 224, the segment computation module 226, the location finder 228, and the privacy protection module 230.

The bus 508 is configured to link together various circuits. In this example, the tracking system 102 employing the processing system 502 and the non-transitory computer readable medium 506 may be implemented with bus architecture, represented generally by bus 508. The bus 508 may include any number of interconnecting buses and bridges depending on the specific implementation of the tracking system 102 and the overall design constraints. The bus interface 510 may be configured to provide an interface between the bus 508 and other circuits, such as, the transceiver 512, and external devices, such as the ETC system 112, the data sources 116, and the vehicle owners 118.

The transceiver 512 may be configured to provide the tracking system 102 with various other apparatus, such as the external devices. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the mobile interface 202, the web interface 204, the communication channel 206, the web server 208, the computation module 102a, the ETA prediction module 210, the TPF determination module 218, the error correction module 220, the driver factor determination module 222, the selection module 224, the segment computation module 226, the location finder 228, and the privacy protection module 230 may include software that may be executed across a single or multiple processing environments.

In an aspect of the disclosure, the hardware processor 504, the non-transitory computer readable medium 506, or a combination of both may be configured or otherwise specially programmed to execute the operations or functionality of the mobile interface 202, the web interface 204, the communication channel 206, the web server 208, the computation module 102a, the ETA prediction module 210, the TPF determination module 218, the error correction module 220, the driver factor determination module 222, the selection module 224, the segment computation module 226, the location finder 228, and the privacy protection module 230, or various other components described herein, as described with respect to FIGS. 1A to 3.

Various embodiments of the disclosure comprise the tracking system 102 that may be configured to predict the ETA for vehicles, such as the tracked vehicle 106. The tracking system 102 may comprise, for example, the mobile interface 202, the web interface 204, the communication channel 206, the web server 208, the computation module 102a, the ETA prediction module 210, the TPF determination module 218, the error correction module 220, the driver factor determination module 222, the selection module 224, the segment computation module 226, the location finder 228, and the privacy protection module 230.

The scanning module 113 installed at a toll plaza for ETC scanning the tracked vehicle 106 and same and similar (SaSi) vehicles crossing the toll plaza. The SaSi vehicles, i.e., the first plurality of vehicles 108, are identified based on a plurality of predetermined factors. The plurality of predetermined factors may comprise driver characteristics that determine deviation of a driver from an average speed in an upstream segment for addition to predicted value in downstream segments, and delay at toll plaza.

The computation module 102a may be configured to compute a segment time for plurality of segments from time difference between the ETC scans in two consecutive toll plazas for the SaSi vehicles moving ahead of the tracked vehicle. the segment time is computed based on a defined criteria. the defined criteria comprises at least a method, a vehicle type, a time window, and one or more features, wherein each segment from the plurality of segments is defined between a starting point and a final destination of a vehicle journey with a toll plaza at beginning and end of the segment The computation module 102a may be configured to compute the segment time for the plurality of segments in an event of presence of non-SaSi vehicles or absence of toll road. in an event of the absence of toll road or a journey with presence of non-SaSi vehicles, a non-SaSi approach is adopted based on speed differentiable method or speed ratio methods, time window, toll plaza delay and driver characteristics.

The computation module 102a may be configured to compute the error at a first segment of the two successive segments based on correction factor derived from actual crossing time and expected crossing time, and factor the computed error in predicting arrival at second successive segment.

The computation module 102a may be further configured to compute the segment time based on actual driving time along with actual waiting time of the SaSi vehicles at the toll plaza. In accordance with an embodiment, the SaSi vehicles travelling in same segment time under similar weather, traffic and road conditions in the same time window are tracked. In accordance with an embodiment, the SaSi vehicles are moving ahead of the tracked vehicle by at least one toll plaza. In an event vehicles are outside the same time window, the SaSi vehicles are identified from the vehicles based on vehicle characteristics, segment of toll way, and traveling time with differential weights assigned for different time windows. In accordance with an embodiment, the SaSi vehicles are identified based on the predetermined factors through statistical methods or machine learning algorithms such as time series analysis.

The segment computation module 226 is selected using the selection module 224 for determining predicted traveling time based on method, location, actual or expected crossing time, event time, license plate of vehicle, features of the tracked vehicle 106, or other parameters. the features comprise of segment ID, vehicle attributes, time, traffic, weather, road conditions, toll plaza condition, driver characteristics and events impacting road traffic.

In accordance with an embodiment, SaSi algorithm within time window (WTW) of the computing module is selected in an event the SaSi vehicles have moved ahead of the tracked vehicle within a configurable time period. In accordance with an embodiment, a SaSi algorithm outside time window (OTW) of the computing module is selected in an event no SaSi vehicles have moved ahead of the tracked vehicle within a configurable time period. In accordance with an embodiment, a SaSi algorithm extended time window (EXTW) along with SaSi time-of-day-previous-day (StodP) of the computing module is selected in an event SaSi vehicles have moved ahead of the tracked vehicle between a configurable time range.

In accordance with an embodiment, a crossing lag is computed based on current time and expected crossing time, and wherein in an event the crossing lag is between a configurable time range, at least a first weight is assigned to timethruextendedTW algorithm and a second weight is assigned to the StodP algorithm. In an event the crossing lag is between a configurable time range, at least a first weight is assigned to the timethruextendedTW algorithm and a second weight is assigned to the StodP algorithm.

In accordance with an embodiment, the ETA prediction module 210 may be configured to predict the ETA of the tracked vehicle 106 based on the computed segment time and periodic error correction module between successive segments.

Various embodiments of the disclosure may provide a non-transitory computer-readable medium, such as the non-transitory computer readable medium 506, having stored thereon, computer implemented instruction that when executed by a processor causes the tracking system 102 to execute operations to predict ETA of vehicles. The proposed system may execute operations comprising scanning a tracked vehicle and same and similar (SaSi) vehicles crossing a toll plaza. The SaSi vehicles are identified based on a plurality of predetermined factors. The tracking system 102 may execute operations comprising computing a segment time for plurality of segments from time difference between the ETC scans in two consecutive toll plazas for the SaSi vehicles moving ahead of the tracked vehicle. The segment time is computed based on a defined criteria. The tracking system 102 may further execute operations comprising computing the segment time for the plurality of segments in an event of presence of non-SaSi vehicles or absence of toll road. The tracking system 102 may further execute operations comprising predicting the ETA of the tracked vehicle based on the computed segment time and periodic error correction module between successive segments The proposed system and method for predicting the ETA of vehicles may provide two solutions as described above. The two solutions are ETA Solution and Location Solution that may be used in the following scenarios as a primary tracking method for the tracked vehicle 106. The two solutions may be further used as a secondary tracking method for the tracked vehicle 106, playing the backup role during GPS outages. The two solutions may be further used as an auditing tool to validate the GPS method, when a new vendor is on-boarded or new scenarios arises in the workflow.

As described above, the existing conventional solutions have many disadvantages in tracking system. For example, algorithms use general data instead of specific data for the type of vehicle being tracked, important data can't be accessed in real-time, and technology limitations. The proposed system and method overcome such challenges and provide two solutions— the ETA Solution and the Location Solution that are based on a unique combination of data fusion, and real-time data collection combined with an algorithm, which enhances the accuracy of ETA.

The proposed solution predicts the time taken to cross a given toll way segment, by a set of SaSi vehicles, which are similar to the tracked vehicle 106. This segment time taken from this focussed group of freight trucks, i.e., the set of SaSi vehicles, will be the closest time for the tracked vehicle 106 to cross this particular segment. Prediction can be based on either real-time data for the SaSi vehicles or historical data available for them. In addition, it observes the driver characteristics in the segments already crossed(upstream) at any point of time, and factors that behaviour into the segments yet to be crossed (downstream). Further, the tracking system 102 calculates the segment time, by taking time difference between ETC scans in two consecutive poll plaza for the SaSi vehicles moving ahead of the tracked vehicle 106 and uses that time to calculate ETA for the tracked vehicle 106. This approach is more accurate than other GPS-based algorithms because it takes actual driving time plus the actual waiting time in the toll plaza, in the same time window. The proposed solution involves acquiring data from multiple sources and running the prediction algorithm every time the tracked vehicle 106 crosses a toll plaza. Further, ETC scan timestamps for the tracked vehicle 106 and SaSi may be obtained on a real-time basis only with data sharing arrangement with ETC or its partners. While other methods have taken traffic condition (historical and current), road condition (historical and current), weather condition (historical and current), driver profile and mood, no other system has taken vehicle characteristics, concept of similar vehicles, its current condition, weight being carried, and the like, as considered by the proposed solution. As the proposed system has access to characteristics of the tracked vehicle 106, SaSi vehicles and driver pattern for the trip, it takes this specific information and calculates the ETA. Hence its prediction accuracy at every toll plaza crossing is more than other conventional tracking system which do not have this data. It achieves a better performance at a fractional cost of GPS-based system.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., ASICs, by program instructions being executed by one or more processors, or by a combination of both. Additionally, these sequences of actions described herein can be considered to be embodied entirely within any nontransitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the operations as described herein for predicting ETA of vehicles.

The present disclosure may also be embedded in a computer program product, which comprises all the features enabling the implementation of the methods described herein, and which when loaded in a computer system is able to conduct these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or operations described in connection with the embodiments disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system, or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, operations and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:
   a scanning installed at a toll plaza for electronic toll collection (ETC),
   wherein the scanning module is configured to scanner:
   continuously scan vehicles to identify a tracked vehicle and same and similar (SaSi) vehicles that cross the toll plaza, wherein the identification is based on reading of license plate data or RFID tags in real-time, and
   generate a time-stamped crossing data associated with the SaSi vehicles, wherein
      the SaSi vehicles are identified based on a plurality of predetermined factors through statistical methods or machine learning algorithms such as time series analysis,
      the SaSi vehicles are moving ahead of the tracked vehicle by at least one toll plaza, and
      in an event the vehicles are outside a same time window, the SaSi vehicles are identified based on vehicle characteristics, segment of toll way, and traveling time with differential weights assigned for different time windows;
   a processor configured to:
   receive the time-stamped crossing data generated by the scanning module from at least two consecutive toll plazas in real-time, wherein the time-stamped crossing data identifies the Sasi vehicles that have physically traversed a segment defined between the two consecutive toll plazas in a time window aligned with a route of the tracked vehicle;
   compute a segment time for a plurality of segments from time difference between ETC scans in the two consecutive toll plazas for the SaSi vehicles moving ahead of the tracked vehicle, wherein the segment time is computed based on a defined criteria; and
   compute the segment time for the plurality of segments in an event of a presence of non-SaSi vehicles or an absence of toll road; and
   predict expected time of arrival (ETA) of the tracked vehicle based on the computed segment time and periodic error correction between successive segments.

2. The system according to claim 1, wherein the processor is further configured to compute the segment time based on actual driving time along with actual waiting time of the SaSi vehicles at the toll plaza, and
   wherein the defined criteria comprises at least a method, a vehicle type, a time window, and one or more features.

3. The system according to claim 1, wherein the SaSi vehicles that travel in a same segment time under similar weather, traffic and road conditions in the same time window are tracked.

4. The system according to claim 1, wherein the plurality of predetermined factors comprises driver characteristics that determine deviation of a driver from an average speed in an upstream segment for addition to predicted value in downstream segments, and delay at the toll plaza.

5. The system according to claim 1, wherein each segment from the plurality of segments is defined between a starting point and a final destination of a vehicle journey with the toll plaza at beginning and end of the segment.

6. The system according to claim 1, wherein a SaSi algorithm within time window (WTW) of the processor is selected in an event the SaSi vehicles have moved ahead of the tracked vehicle within a configurable time period.

7. The system according to claim 1, wherein a SaSi algorithm outside time window (OTW) of the processor is selected in an event none of the SaSi vehicles have moved ahead of the tracked vehicle within a configurable time period.

8. The system according to claim 1, wherein a SaSi algorithm extended time window (EXTW) along with Sasi time-of-day-previous-day (StodP) of the processor is selected in an event SaSi vehicles have moved ahead of the tracked vehicle within a configurable time range.

9. The system according to claim 8, wherein
   a crossing lag is computed based on current time and expected crossing time, and
   in an event the crossing lag is between a first configurable time range, at least a first weight is assigned to a timethruextendedTW algorithm and a second weight is assigned to a StodP algorithm.

10. The system according to claim 9, wherein in an event the crossing lag is between second configurable time range, at least new first weight is assigned to the timethruextendedTW algorithm and a new second weight is assigned to the StodP algorithm.

11. The system according to claim 1, wherein
    the processor is further configured to determine predicted traveling time based on one of method, location, actual or expected crossing time, event time, license plate of vehicle, features of the tracked vehicle, or other parameters.

12. The system according to claim 11, wherein the features comprise of segment ID, vehicle attributes, time, traffic, weather, road conditions, toll plaza condition, driver characteristics and events that impact road traffic.

13. The system according to claim 1, wherein in an event of the absence of toll road or a journey with presence of non-SaSi vehicles, a non-SaSi approach is adopted based on speed differentiable method or speed ratio methods, time window, toll plaza delay and driver characteristics.

14. The system according to claim 1, wherein the processor is further configured to:
    compute an error at a first segment of two successive segments of the plurality of segments based on correction factor derived from actual crossing time and expected crossing time, and
    predict an arrival at a second segment of the two successive segments based on the computer error.

15. A method, comprising:
    continuously scanning, by a processor, vehicles for identifying a tracked vehicle and same and similar (SaSi) vehicles crossing a toll plaza;
    generating, by the processor, a time-stamped crossing data associated with the SaSi vehicles from at least two consecutive toll plazas in real-time, wherein
       the time-stamped crossing data identifies the Sasi vehicles that have physically traversed a segment defined between the two consecutive toll plazas in a time window aligned with a route of the tracked vehicle,
       the identification is based on reading of license plate data or RFID tags in real-time,
       the SaSi vehicles are identified based on a plurality of predetermined factors through statistical methods or machine learning algorithms such as time series analysis, and
       the SaSi vehicles are moving ahead of the tracked vehicle by at least one toll plaza, and
       in an event the vehicles are outside a same time window, the SaSi vehicles are identified based on vehicle characteristics, segment of toll way, and traveling time with differential weights assigned for different time windows;
    computing, by the processor, a segment time for a plurality of segments from time difference between electronic toll collection (ETC) scans in the two consecutive toll plazas for the SaSi vehicles moving ahead of the tracked vehicle, wherein the segment time is computed based on a defined criteria;
    computing, by the processor, the segment time for the plurality of segments in an event of a presence of non-SaSi vehicles or an absence of toll road; and
    predicting, by the processor, expected time of arrival (ETA) of the tracked vehicle based on the computed segment time and periodic error correction between successive segments.

16. The method according to claim 15, further comprising:
    computing, by the processor, an error at a first segment of two successive segments based on correction factor derived from actual crossing time and expected crossing time, and
    predicting, by the processor, an arrival at a second segment of the two successive segments based on factoring in of the computed error.

17. A non-transitory computer readable medium, having stored thereon, computer executable code, which when executed by a processor, cause the processor to execute operations, the operations comprising:
    continuously scanning vehicles for identifying a tracked vehicle and same and similar (SaSi) vehicles crossing a toll plaza;
    generating a time-stamped crossing data associated with the SaSi vehicles from at least two consecutive toll plazas in real-time, wherein
       the time-stamped crossing data identifies the Sasi vehicles that have physically traversed a segment defined between the two consecutive toll plazas in a time window aligned with a route of the tracked vehicle,
       the identification is based on reading of license plate data or RFID tags in real-time,
       the SaSi vehicles are identified based on a plurality of predetermined factors through statistical methods or machine learning algorithms such as time series analysis, and
       the SaSi vehicles are moving ahead of the tracked vehicle by at least one toll plaza, and
       in an event the vehicles are outside a same time window, the SaSi vehicles are identified based on vehicle characteristics, segment of toll way, and traveling time with differential weights assigned for different time windows;
    computing a segment time for plurality of segments from time difference between electronic toll collection (ETC) scans in the two consecutive toll plazas for the SaSi vehicles moving ahead of the tracked vehicle, wherein the segment time is computed based on a defined criteria;
    computing the segment time for the plurality of segments in an event of a presence of non-SaSi vehicles or an absence of toll road; and
    predicting expected time of arrival (ETA) of the tracked vehicle based on the computed segment time and periodic error correction between successive segments.

* * * * *